(12) United States Patent
Ariga et al.

(10) Patent No.: US 7,072,375 B2
(45) Date of Patent: Jul. 4, 2006

(54) LINE-NARROWED GAS LASER SYSTEM

(75) Inventors: Tatsuya Ariga, Hiratsuka (JP); Kyohei Seki, Tokyo (JP); Osamu Wakabayashi, Hiratsuka (JP)

(73) Assignees: Gigaphoton Inc., Tokyo (JP); Ushio Denki Kabushiki Kaisya, Tokyo (JP)

( * ) Notice: Subject to any disclaimer, the term of this patent is extended or adjusted under 35 U.S.C. 154(b) by 242 days.

(21) Appl. No.: 10/371,478

(22) Filed: Feb. 20, 2003

(65) Prior Publication Data

US 2003/0227954 A1    Dec. 11, 2003

(30) Foreign Application Priority Data

Feb. 22, 2002 (JP) ............................. 2002-046328

(51) Int. Cl.
*H01S 3/22* (2006.01)

(52) U.S. Cl. ............................................ 372/55; 372/57

(58) Field of Classification Search ................. 372/19, 372/55, 57
See application file for complete search history.

(56) References Cited

U.S. PATENT DOCUMENTS

| | | | |
|---|---|---|---|
| 5,450,436 A | 9/1995 | Mizoguchi et al. ............ | 372/59 |
| 6,243,406 B1 | 6/2001 | Heist et al. .................... | 372/59 |
| 6,381,256 B1 * | 4/2002 | Stamm et al. ................. | 372/19 |
| 6,549,555 B1 | 4/2003 | Serwazi et al. ............... | 372/59 |
| 6,563,853 B1 | 5/2003 | Heist et al. .................... | 372/57 |
| 6,567,450 B1 * | 5/2003 | Myers et al. .................. | 372/55 |
| 6,577,663 B1 * | 6/2003 | Vogler .......................... | 372/57 |
| 6,603,788 B1 * | 8/2003 | Vogler et al. .................. | 372/57 |
| 6,785,316 B1 * | 8/2004 | Bragin et al. ................. | 372/87 |
| 6,839,375 B1 * | 1/2005 | Lokai et al. ................... | 372/92 |
| 6,862,307 B1 * | 3/2005 | Osmanow et al. ........ | 372/38.03 |

FOREIGN PATENT DOCUMENTS

JP     2001-024265     1/2001

* cited by examiner

*Primary Examiner*—James Menefee
(74) *Attorney, Agent, or Firm*—Dellett & Walters

(57) ABSTRACT

In a line-narrowed gas laser system such as a line-narrowed molecular fluorine laser system, ASE is cut off to obtain a spectral linewidth of 0.2 pm or lower and a spectral purity of 0.5 pm or lower. The laser system comprises a laser chamber filled with an $F_2$-containing laser gas, discharge electrodes located in the laser chamber, a laser resonator and a line-narrowing module located in the laser resonator with a wavelength selection element, so that a line-narrowed laser beam emerges from the laser resonator. To cut off ASE from the laser beam emerging from the laser resonator, the duration from laser emission by discharge to generation of a laser beam is preset. Rise of the sidelight is made so gentle that the starting point of a laser pulse can exist after the time of the first sidelight peak.

20 Claims, 23 Drawing Sheets

LINE-NARROWED GAS LASER SYSTEM

BACKGROUND OF THE INVENTION

The present invention relates generally to a line-narrowed gas laser system, and more particularly to a gas laser system such as an $F_2$ laser system in which laser beams are narrowed to a spectral linewidth of 0.2 pm or lower and a spectral purity of 0.5 pm or lower while ASE (amplified spontaneous emission) is substantially cut off from the laser beams.

The present invention is also concerned with a gas laser system using laser gases inclusive of $F_2$, for instance, a KrF or ArF laser system, in which the ASE is cut off from laser beams, thereby making spectral linewidths and spectral purities by far narrower.

As semiconductor integrated circuits become increasingly fine with increasing packing densities, aligners used for their fabrication are now required to have stronger resolving power than ever before. It is in turn required to make shorter the wavelengths of exposure light emitted from exposure light sources. To this end, semiconductor aligner light sources are changed from conventional mercury lamps over to 248-nm wavelength KrF lasers, and 193-nm wavelength ArF lasers are being used as light sources for much shorter wavelengths.

For photolithographic technologies to achieve on semiconductors a semiconductor integrated circuit having a linewidth of 70 nm or less, there are demanded exposure light sources of wavelengths of 160 nm or less. $F_2$ (molecular fluorine) laser systems that give out ultraviolet rays of wavelengths of around 157 nm are now thought of as a promising candidate for those light sources, and the tempo of research and development aimed at mounting those light sources on aligners is quickened. Thus, the present invention is directed to performance improvements in KrF and ArF laser systems and performance improvements in $F_2$ laser systems with a view to mounting them on semiconductor aligners.

The optical technology is roughly broken down into the following two types that use:

1) a dioptric system, and
2) a catadioptric system.

A typical dioptric system is a projection optical system commonly used with prior art aligners. One grave problem with photolithography is how to correct chromatic aberrations in an optical system. With the dioptric system, correction of chromatic aberrations has been achieved by combinations of lenses or other optical elements having different kinds of refractive indices. By virtue of some limitations on the types of available optical materials transparent to a wavelength range in the neighborhood of 157 nm, however, there is now no option but to use $CaF_2$ (fluorite).

The use of the catadioptric system for photo-lithography ensures that chromatic aberrations are reduced by using a reflecting optical element having no chromatic dispersion in combination with a refracting optical element. For this reason, an aligner using such a catadioptric system holds great promising in a wavelength range of the order of current 157 nm. However, the catadioptric systems are not so often used as conventional dioptric systems by virtue of difficulties with the optical axis alignment of aligners.

There is one promising means for making the dioptric system commonly used in the prior art compatible with the wavelength range of around 157 nm. That is to use as an aligner light source an $F_2$ laser system designed to give out line-narrowed laser beams.

Although depending on running conditions such as the total pressure of a discharge gas or the like, the spectral full width at half maximum (FWHM) of an $F_2$ laser beam is of the order of 1.5 to 1.2 pm when its bandwidth is not narrowed (in free running operation modes). For the dioptric system, this spectral full width at half maximum must be narrowed down to 0.2 pm or less. For KrF and ArF laser systems, too, the bandwidth of laser beams must be narrowed because their full width at half maximum (FWHM) on free running operation is as wide as several hundred nm. The present invention is directed to the line-narrowing technique.

One exemplary construction of a line-narrowed $F_2$ laser system using one or more expanding prisms and a diffraction grating is shown in FIG. 1. It is noted that a line-narrowed KrF or ArF laser system, too, has a similar construction.

A laser chamber 1 is filled therein with an $F_2$ laser-inducing medium gas (hereinafter called the laser gas). As high-voltage pulses are applied from a high-voltage pulse generator 3 to a pair of electrodes 2 provided in the laser chamber 1 and located oppositely at a given spacing, discharge is generated between the electrodes 2 so that the laser gas is excited at a discharge portion. The excited laser gas gives out seed light turning to a laser beam. Within the laser chamber 1 there are further provided a fan 4 and a radiator (although not shown). The laser gas is circulated within the laser chamber by the fan 4, and the laser gas heated by discharge to a high temperature is cooled down by way of heat exchange with the radiator. As shown in FIG. 1, the laser chamber 1 includes windows 5 in which window members, each in a ⋏-shaped form, are mounted at a Brewster's angle or a parallel Brewster's angle. For the electrodes 2, an anode electrode and a cathode are located at a given spacing in the vertical direction to the paper.

A laser resonator is built up of a diffraction grating 8 mounted on a line-narrowing module 6 described layer and an output mirror 9.

The aforesaid seed light that turns to a laser beam makes round trips between the line-narrowing module 6 including a diffraction grating 8 and a magnifying prism 7 and the output mirror 9 by way of the discharge portion, and is extracted as the laser beam from the output mirror 9.

A part of the laser beam emerging out of the output mirror 9 is introduced through a beam splitter 10 into a wavelength monitor 11, where the output, center wavelength, etc. are measured.

Line-narrowing occurs through the optical line-narrowing module 6 having a spectral function, which is located within the laser resonator. For instance, the line-narrowing module 6 is made up of a casing and a diffracting grating 8 and an expanding prism 7 located in the casing, and spectral line-narrowing is achievable through wavelength selection by the diffraction grating 8.

It is possible to vary the center wavelength of oscillation by rotation of either one of the diffraction grating 8 and the expanding prism 7.

It is noted that when a highly reflective mirror is located at any position between the laser chamber 1 and the diffraction grating 8, it is also possible to rotate the highly reflective mirror to vary the angle of incidence of light on the diffraction grating 8, thereby varying the center wavelength of oscillation.

Wavelength control is implemented by rotation of any one of the diffraction grating 8 and the expanding prism 7 in the line-narrowing module 6 or the highly reflective mirror located at any position between the laser chamber 1 and the diffraction grating 8 (although not shown) in response to center wavelength signals from the wavelength monitor 11.

Even when such an optical line-narrowing module having a spectral function is used in the laser resonator as the line-narrowing means for a line-narrowed $F_2$ laser system, it is still difficult to narrow its spectral linewidth (FWHM) to 0.2 pm or less demanded for the dioptric system of an aligner.

Here let $\Delta\lambda$ be a spectral linewidth, W be the width of a light beam incident on the diffracting grating and $\theta$ be the blaze angle (=Littrow angle) of the diffraction grating. Then, the relations are $$\Delta\lambda \propto \cos\theta/W$$

That is, the larger the blaze angle $\theta$ of the diffraction angle and the wider the width of the light beam incident on the diffraction angle, the narrower the spectral linewidth $\Delta\lambda$ becomes.

To increase the light beam width W, it is necessary to increase the expanding factor of the expanding prism or the number of expanding prisms and widen the width of the diffraction grating. When it comes to an aligner light source, however, there are some limitations on system size at a worksite and, hence, some limitations on the size of a line-narrowing module used thereat. For the reason that the light transmittance of an expanding prism is not 100% with respect to 157-nm wavelength light, the more the expanding prisms, the lower the oscillation efficiency becomes. Thus, there are limits to increasing the number of expanding prisms and the width of the diffraction grating.

There are also limits ascribable to optical part fabrication techniques. For instance, the blaze angle cannot possibly be larger than a predetermined value because of limits to diffraction grating fabrication.

Under such situations, optical line-narrowing has some limits.

Proc. SPIE Vol. 3679, (1999) 1030–1037 shows that as the laser pulse width increases, the spectral linewidth of laser light becomes narrow. This has actually been demonstrated through experimentation by the inventors.

In other words, to achieve further line-narrowing beyond the aforesaid limits to optical line-narrowing, it is required to stretch the pulse of a laser beam (pulse stretching).

Even with pulse stretching, however, it is still difficult to narrow the spectral linewidth (FWHM) to 0.2 pm or less.

This is for the following reasons. Like excimer lasers (KrF, ArF, XeCl, etc.), molecular fluorine $F_2$ lasers have high gains. When it comes to a laser system, high gain means that light emerging from the output mirror contains much light without resonated in a line-narrowing module (amplified spontaneous emission (ASE) or, in another parlance, parasitic oscillation light). The ASE is light that is emitted from the output mirror with no round trip in the laser resonator, and hardly subjected to line-narrowing probably because it has not passed, or passed only once, through the line-narrowing module. A laser beam given out of a conventional line-narrowed $F_2$ laser system contains the ASE component that makes it difficult to narrow the spectral linewidth (FWHM) of the laser beam to 0.2 pm or lower. Why the ASE occurs is now explained in detail.

FIG. 2 is illustrative of the progressions over time of the waveform of sidelight upon laser oscillation (hereinafter called simply the sidelight), the waveform of laser pulse and spectral linewidth oscillated from a prior art $F_2$ laser system in which the spectral linewidth (FWHM) cannot be narrowed to 0.2 pm or less. It is here noted that these waveforms were obtained with a laser resonator formed of a diffraction grating and an output mirror and having a length of 1,500 mm.

Here the light generated by a laser gas excited by discharge occurring between a pair of electrodes is called the "sidelight". The sidelight is observed from a position that is not located on the laser resonator (for instance, the electrode side position in a substantially vertical direction to the longitudinal direction of the electrodes).

The waveform of the sidelight is indicative of a gain distribution over time of the laser beam. In other words, the sidelight is indicative of a gain distribution upon laser oscillation.

A laser pulse rises sharply beyond a threshold value upon the sidelight reaching a peak. In other words, main laser oscillation (not ASE oscillation) rises sharply from the starting point defined by the first peak of the sidelight.

In the laser pulse waveform, one peak is observed at a position after 20 ns from the discharge excitation start (0 ns). A spectral linewidth of this peak position at a time A was much the same as that on free running operation. Regarding to FIG. 2, it is noted that the ordinate as spectral linewidth is not linear, and a spectral linewidth at the time A is actually considerably large, although it looks as an about 0.4 pm spectral linewidth.

As already described, an $F_2$ laser system has high gain as in the case with excimer lasers (e.g., KrF, ArF, XeCl lasers). In a laser system having high gain, as gain rises and goes beyond a given value (that is, a given time goes by after the rise of gain), oscillation (ASE) occurs by light that makes one single pass through the resonator without making round trips therein.

A peak at the time A of the laser pulse waveform shown in FIG. 2 was also observed in a misalignment state where the optical axis of the laser resonator was displaced. Accordingly, the light for the first peak portion of the laser pulse waveform is thought of as the ASE. As already described, the ASE is light that is emitted out of the output mirror without making round trips in the laser resonator, and is hardly subjected to line-narrowing probably because it has not passed, or passed only once, through the line-narrowing module.

The light that is not extracted as the ASE makes round trips in the laser resonator and subjected to line-narrowing, leaving the laser system as a laser beam.

As shown schematically in FIG. 3(*a*), the spectral linewidth of one laser pulse is the integral over time of each spectral linewidth at each point of time in the laser pulse, and so when the ASE is given out in an early state of the laser pulse, the result is that it is difficult to narrow the spectral linewidth to 0.2 pm or lower. That is, as shown schematically in FIG. 3(*b*), the ASE having a spectral linewidth of 0.6 pm or greater is superposed on the spectral properties of the laser pulse. This in turn causes the overall integration spectrum of the laser pulse to have a spectral linewidth of greater than 0.2 pm even though the spectral linewidth of main laser oscillation is somehow not greater than 0.2 pm.

With the laser pulse waveform containing the ASE, on the other hand, it is difficult to satisfy the specifications of an aligner light source in terms of spectral purity.

The "spectral purity" used herein is understood to refer to an index to the degree of concentration of spectral energy, indicating a linewidth including a "certain area ratio" of a spectral waveform. For instance, a commonly used "95% purity" refers to a linewidth that accounts for 95% of the entire area of that spectral waveform, as measured from its center side. The spectral purity usually needed for a dioptric type of photo-lithographic light source is 0.5 pm.

As already described, the ASE is light that is hardly subjected to line-narrowing. Even though the pulse of a laser beam is somehow stretched, the hem form of the spectral integration waveform shown in FIG. 3 remains invariable as long as the ASE component exists. It is thus impossible to satisfy the specifications regarding the spectral purity although depending on what is demanded for an aligner. While the values of the spectral linewidth and spectral purity demanded vary with wavelenth, it is understood that such problems as mentioned above arise with KrF and ArF laser systems.

SUMMARY OF THE INVENTION

In view of such problems with the prior art as described above, it is a general object of the present invention to provide a gas laser system using an $F_2$-containing laser gas, for instance, a KrF laser system, an ArF laser system, and an $F_2$ laser system, which has improved line-narrowing capability. A particular object of the present invention is to provide a line-narrowed $F_2$ laser system wherein the ASE is cut off to achieve a spectral linewidth of 0.2 pm or lower and a spectral purity of 0.5 pm or lower.

According to the first aspect of the invention, these objects are attainable by the provision of a line-narrowed gas laser system comprising a laser chamber filled with an $F_2$-containing laser gas, discharge electrodes located in the laser chamber, a laser resonator and a line-narrowing module located in the laser resonator with a wavelength selection element so that a line-narrowed laser beam emerges from the laser resonator, characterized in that:

a duration from a point of time of laser emission by discharge to generation of a laser beam is preset in such a way that ASE is substantially cut off from the laser beam emerging from the laser resonator.

According to the second aspect, the present invention provides a line-narrowed gas laser system comprising a laser chamber filled with an $F_2$-containing laser gas, discharge electrodes located in the laser chamber, a laser resonator and a line-narrowing module located in the laser resonator with a wavelength selection element so that a line-narrowed laser beam emerges from the laser resonator, characterized in that:

a duration from a point of time of laser emission by discharge to generation of a laser beam is preset in such a way that at a point of time of generation of the laser beam to emerge from the laser resonator, the laser beam has a given spectral linewidth (FWHM) and/or a given spectral purity.

According to the third aspect, the present invention provides a line-narrowed gas laser system comprising a laser chamber filled with an $F_2$-containing laser gas, discharge electrodes located in the laser chamber, a laser resonator and a line-narrowing module located in the laser resonator with a wavelength selection element so that a line-narrowed laser beam emerges from the laser resonator, characterized in that:

a duration from a point of time of laser emission by discharge to generation of a laser beam is preset in such a way that ASE is substantially cut off from the laser beam emerging out of the laser resonator, and at a point of time of generation of the laser beam to emerge out of the laser resonator, the laser beam has a given spectral linewidth (FWHM) and/or a given spectral purity.

According to the fourth aspect, the present invention provides a line-narrowed gas laser system comprising a laser chamber filled with an $F_2$-containing laser gas, discharge electrodes located in the laser chamber, a laser resonator and a line-narrowing module located in the laser resonator with a wavelength selection element so that a line-narrowed laser beam emerges from the laser resonator, characterized by further comprising:

a discharge emission detector (or a sidelight detector) for detecting a pulse waveform over time of laser emission by discharge, a laser pulse detector for detecting a pulse waveform over time of a laser beam, and a controller capable of controlling at least one of a voltage applied to the electrodes, a concentration of $F_2$ in the laser gas and a laser gas pressure in the laser chamber, wherein:

said controller receives data from said discharge emission detector to determine therefrom a time $T_{SL1}$ of generation of a first peak of a discharge emission waveform with an origin defined by a starting point of the discharge emission waveform and data from said laser pulse detector to determine therefrom a time $T_{LP1}$ of generation of a first peak of a laser pulse waveform with the origin defined by the starting point of the discharge emission waveform, so that at least one of the voltage applied to the electrodes, the concentration of $F_2$ in the laser and the laser gas pressure in the laser chamber is controlled to foreclose a possibility of $T_{SL1} > T_{LP1}$, thereby substantially cutting off ASE from the laser beam emerging out of the laser resonator.

According to the fifth aspect, the present invention provides a line-narrowed gas laser system comprising a laser chamber filled with an $F_2$-containing laser gas, discharge electrodes located in the laser chamber, a laser resonator and a line-narrowing module located in the laser resonator with a wavelength selection element so that a line-narrowed laser beam emerges from the laser resonator, characterized by further comprising:

a discharge emission detector (or a sidelight detector) for detecting a pulse waveform over time of laser emission by discharge, a laser pulse detector for detecting a pulse waveform over time of a laser beam, and a controller capable of controlling at least one of a voltage applied to the electrodes, a concentration of $F_2$ in the laser gas and a laser gas pressure in the laser chamber, wherein:

said controller receives data from said discharge emission detector to determine therefrom a time $T_{SL1}$ of generation of a first peak of a discharge emission waveform with an origin defined by a starting point of the discharge emission waveform and data from said laser pulse detector to determine therefrom a time $T_{LPS}$ of generation of a laser pulse waveform with the origin defined by the starting point of the discharge emission waveform, so that at least one of the voltage applied to the electrodes, the concentration of $F_2$ in the laser and the laser gas pressure in the laser chamber is controlled to foreclose a possibility of $T_{SL1} > T_{LPS}$, thereby substantially cutting off ASE from the laser beam emerging out of the laser resonator.

According to the sixth aspect, the present invention provides a line-narrowed gas laser system comprising a laser chamber filled with an $F_2$-containing laser gas, discharge electrodes located in the laser chamber, a laser resonator and a line-narrowing module located in the laser resonator with a wavelength selection element so that a line-narrowed laser beam emerges from the laser resonator, characterized by further comprising:

a discharge emission detector (or a sidelight detector) for detecting a pulse waveform over time of laser emission by discharge, and a controller capable of controlling at least one of a voltage applied to the electrodes, a concentration of $F_2$ in the laser gas and a laser gas pressure in the laser chamber, wherein:

said controller stores ahead a maximum value $\Delta T_1$ of a maximum gradient of a rising edge of a first peak of a discharge emission waveform in the absence of ASE and receives data from the discharge emission detector to determine therefrom the maximum gradient $\Delta T_s$ of the rising edge of the first peak of the discharge emission waveform, so that at least one of the voltage applied to the electrodes, the concentration of $F_2$ in the laser and the laser gas pressure in the laser chamber is controlled to foreclose a possibility of $\Delta T_s > \Delta T_1$, thereby substantially cutting off ASE from the laser beam emerging out of the laser resonator.

According to the seventh aspect, the present invention provides a line-narrowed gas laser system comprising a laser chamber filled with an $F_2$-containing laser gas, discharge electrodes located in the laser chamber, a laser resonator and a line-narrowing module located in the laser resonator with a wavelength selection element so that a line-narrowed laser beam emerges from the laser resonator, characterized by further comprising:

a discharge emission detector (or a sidelight detector) for detecting a pulse waveform over time of laser emission by discharge, and a controller capable of controlling at least one of a voltage applied to the electrodes, a concentration of $F_2$ in the laser gas and a laser gas pressure in the laser chamber, wherein:

said controller stores ahead data on progression over time of a spectral linewidth and/or a spectral purity of light making round trips in the laser resonator and a time $T_{bw}$ obtained from the data, at which values of a given spectral linewidth and/or a given spectral purity are obtained with an origin defined by a starting point of the discharge emission waveform, and receives data from the discharge emission detector to determine therefrom a time $T_{SL1}$ of generation of a first peak of the discharge emission waveform with an origin defined by the starting point of the discharge emission waveform, so that at least one of the voltage applied to the electrodes, the concentration of $F_2$ in the laser and the laser gas pressure in the laser chamber is controlled to foreclose a possibility of $T_{SL1} < T_{bw}$, thereby allowing a laser beam to have the given spectral linewidth (FWHM) and/or the given spectral purity at a point of time of generation of a laser beam to emerge from the laser resonator.

According to the eighth aspect, the present invention provides a line-narrowed gas laser system comprising a laser chamber filled with an $F_2$-containing laser gas, discharge electrodes located in the laser chamber, a laser resonator and a line-narrowing module located in the laser resonator with a wavelength selection element so that a line-narrowed laser beam emerges from the laser resonator, characterized by further comprising:

a discharge emission detector (or a sidelight detector) for detecting a pulse waveform over time of laser emission by discharge, a laser pulse detector for detecting a pulse waveform over time of a laser beam, and a controller capable of controlling at least one of a voltage applied to the electrodes, a concentration of $F_2$ in the laser gas and a laser gas pressure in the laser chamber, wherein:

said controller stores ahead data on progression over time of a spectral linewidth and/or a spectral purity of light making round trips in the laser resonator and a time $T_{bw}$ obtained from the data, at which values of a given spectral linewidth and/or a given spectral purity are obtained with an origin defined by a starting point of the discharge emission waveform, and receives data from the laser pulse detector to determine therefrom a time $T_{LPS}$ of generation of a laser pulse waveform with an origin defined by the starting point of the discharge emission waveform, so that at least one of the voltage applied to the electrodes, the concentration of $F_2$ in the laser and the laser gas pressure in the laser chamber is controlled to foreclose a possibility of $T_{LPS} < T_{bw}$, thereby allowing a laser beam to have the given spectral linewidth (FWHM) and/or the given spectral purity at a point of time of generation of a laser beam to emerge from the laser resonator.

According to the ninth aspect, the present invention a provides a line-narrowed gas laser system comprising a laser chamber filled with an $F_2$-containing laser gas, discharge electrodes located in the laser chamber, a laser resonator and a line-narrowing module located in the laser resonator with a wavelength selection element so that a line-narrowed laser beam emerges from the laser resonator, characterized by further comprising:

a discharge emission detector (or a sidelight detector) for detecting a pulse waveform over time of laser emission by discharge, a laser pulse detector for detecting a pulse waveform over time of a laser beam, and a controller capable of controlling at least one of a voltage applied to the electrodes, a concentration of $F_2$ in the laser gas and a laser gas pressure in the laser chamber, wherein:

said controller has an ASE control function that a line-narrowed laser system as recited in any one of the 4th, 5th and 6th aspects has together with a spectral linewidth (FWHM) function and/or a spectral purity function that a line-narrowed laser system as recited in the 7th or 8th aspect has, so that ASE is substantially cut off from the laser beam emerging out of the laser resonator and a laser beam is allowed to have the given spectral linewidth (FWHM) and/or the given spectral purity at a time of generation of the laser beam to emerge out of the laser resonator.

According to the 10th aspect, the present invention provides a two-stage type line-narrowed gas laser system comprising an oscillation-stage laser and an amplification-stage laser, wherein:

said oscillation-stage laser is a line-narrowed gas laser system as recited in any one of claims 1 to 9.

According to the 11th aspect, the present invention provides a line-narrowed gas laser system as recited in the 10th aspect, characterized in that:

said amplification-stage laser comprises a discharge emission detector (a sidelight detector) for detecting a pulse waveform over time of laser emission by discharge and a controller capable of controlling at least one of a voltage applied to discharge electrodes in the amplification-stage laser, a concentration of $F_2$ in a laser gas and a laser gas pressure in a laser chamber, wherein said controller receives from a controller in the oscillation-stage laser timing data $T_{LPS}$ on a rise of a laser pulse in the oscillation-stage laser, so that on the basis of said data, discharge in the amplification-stage laser starts after the rise of the laser pulse in the oscillation-stage laser.

According to the present invention, the rise of the sidelight is made so gentle that the starting point of a laser pulse can exist after the point of time of the first peak of the sidelight, thereby cutting off the ASE. It is thus possible to achieve a line-narrowed $F_2$ gas laser system having a spectral linewidth of 0.2 pm or lower and a spectral purity of 0.5 pm or lower. It is also possible to achieve a KrF laser system and an ArF laser system having improved line-narrowing capability.

To provide a high output, line-narrowed molecular fluorine laser system, it is possible to make use of an injection lock type arrangement or an MOPA arrangement, wherein the rise of the sidelight is made so gentle in an oscillation-stage laser including a line-narrowing means that the starting point of a laser pulse can exist after the point of time of the first peak of the sidelight, thereby obtaining a spectral linewidth of 0.2 pm or lower and a pulse energy of 5 mJ or higher.

To provide a high output, line-narrowed KrF or ArF laser system, it is possible to make use of an injection lock type arrangement or an MOPA arrangement, wherein the rise of the sidelight is made so gentle in an oscillation-stage laser including a line-narrowing means that the starting point of a laser pulse can exist after the point of time of the first peak of the sidelight, thereby obtaining a spectral linewidth that is narrower than the linewidth needed for an aligner and a pulse energy of 5 mJ or higher.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

DESCRIPTION OF THE PREFERRED EMBODIMENTS

From the summary of the invention, it is understood that to achieve a spectral linewidth of 0.2 pm or less and a spectral purity of 0.5 pm or less, it is required to cut off or remove the ASE component from light emitted out of the line-narrowed $F_2$ laser system. It is also understood that to improve line-narrowing capability, it is necessary to cut off or remove the ASE component light emitted out of the line-narrowed KrF or ArF laser system.

Figure 1:
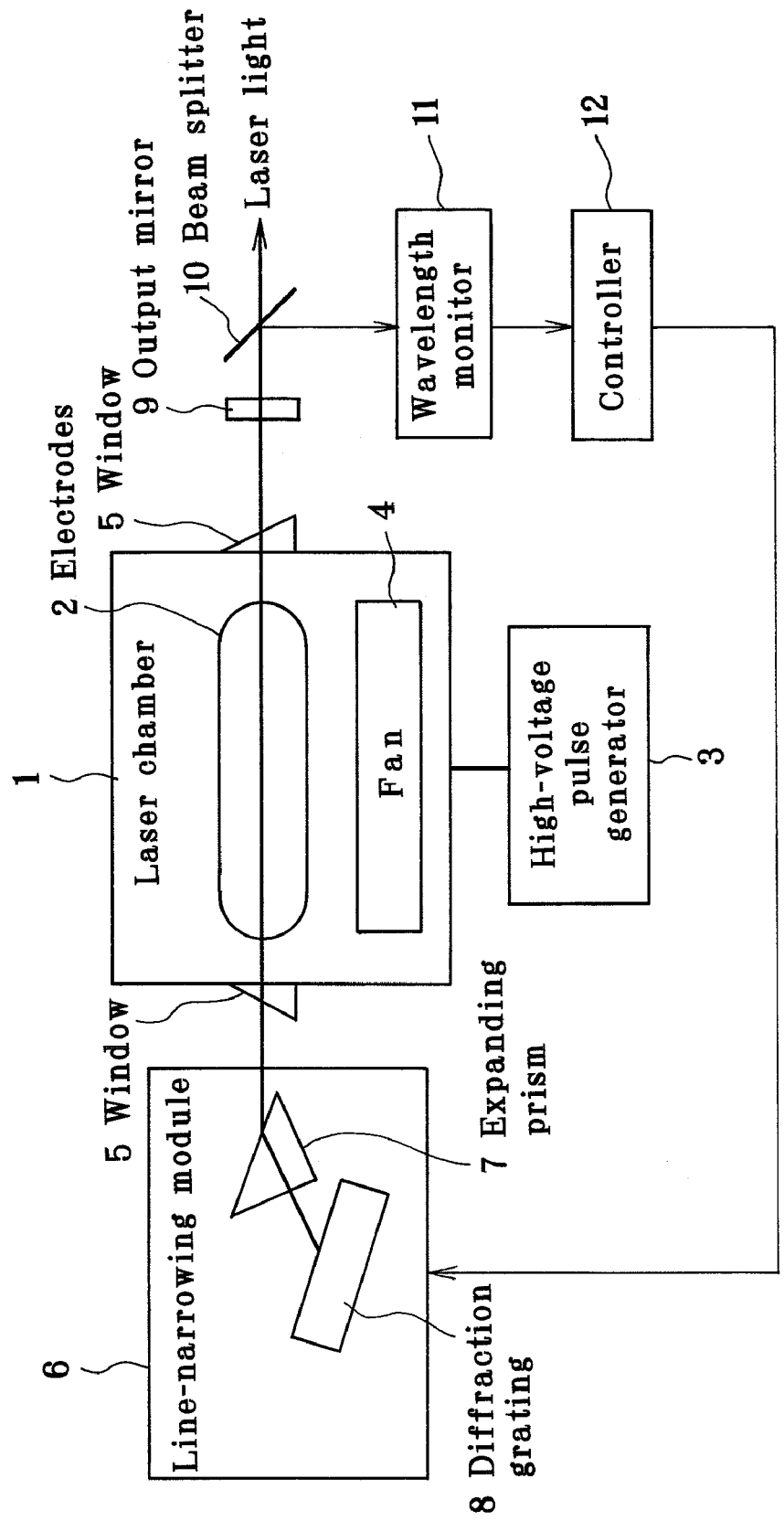
FIG. 1 is illustrative of one exemplary construction of a line-narrowing molecular fluorine laser system.

As a consequence of intensive and extensive studies made by the inventors, it has now been found out that to cut off or remove the ASE component from light emitted out of a line-narrowed $F_2$ laser system such as one shown in FIG. 1, it is effective to make the rise of laser gain gentle and delay the rise starting point of time of a laser pulse. This is also found to hold true for line-narrowed KrF, and ArF laser systems. The present invention is now explained specifically with reference to the line-narrowed $F_2$ laser system.

Figure 5A:
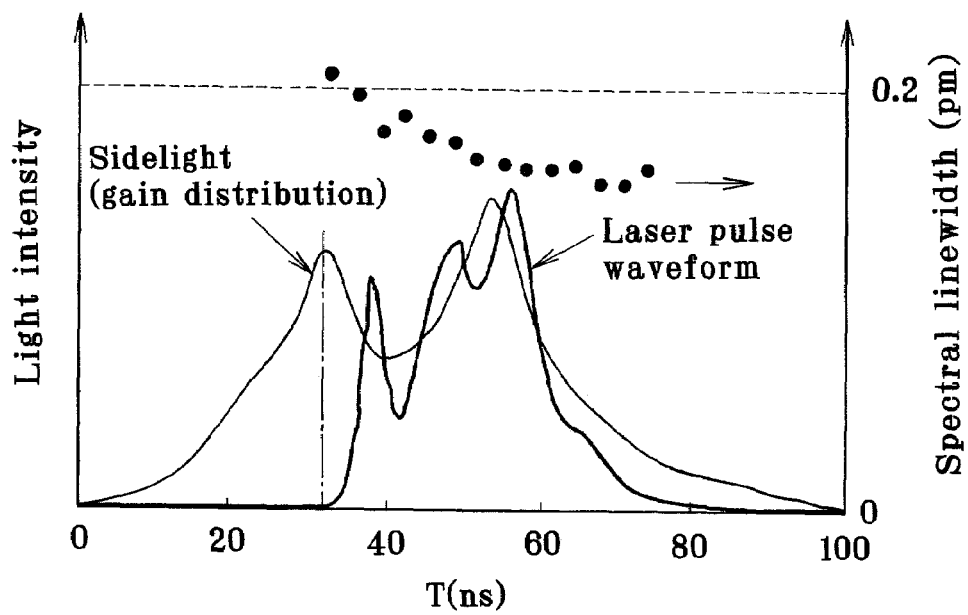
FIG. 5(a) is illustrative of the progressions over time of the laser pulse waveform, the sidelight waveform, and the spectral linewidth according to the present invention.
Figure 5B:
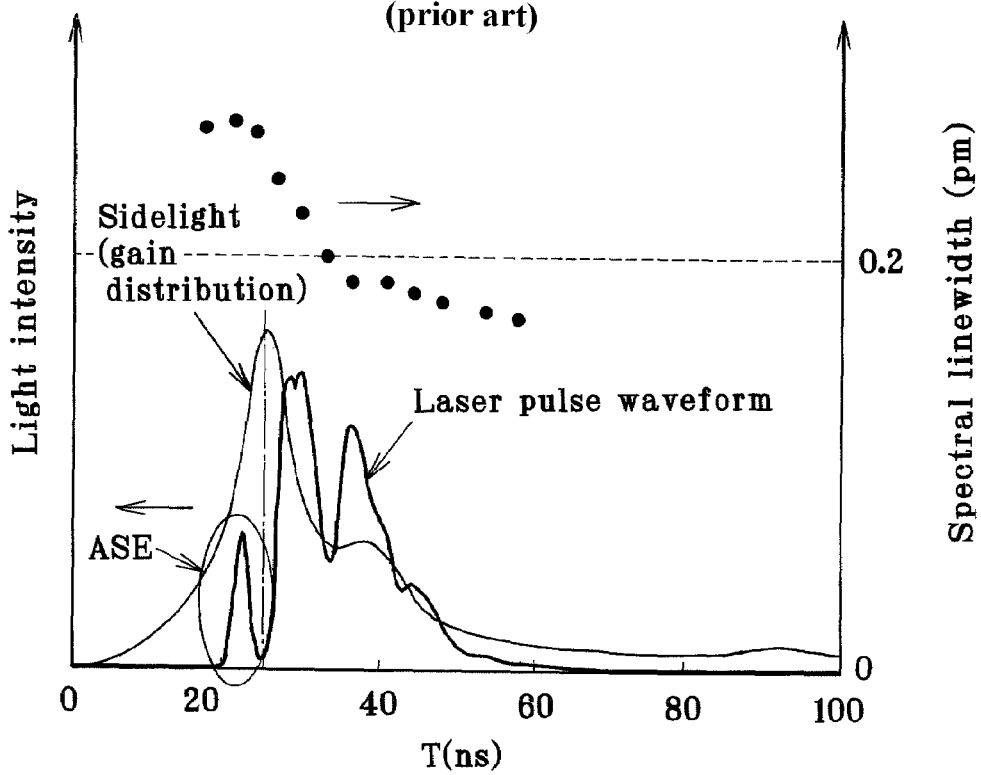
FIG. 5(b) is provided for a comparison with FIG. 5(a), illustrating similar progressions over time of those according to the prior art.

FIG. 5(a) is illustrative of the progressions over time of the laser pulse waveform, the sidelight waveform and the spectral linewidth according to the present invention (as will be described later in detail), and FIG. 5(b) is provided for a comparison with FIG. 5(a), illustrating similar progressions over time. FIG. 5(b) is the same as FIG. 2. It is noted that the length of the laser resonator built up of a diffraction grating and an output mirror and used to glean waveform data for FIG. 5(a) was 1,500 mm as in FIG. 2. The construction of the line-narrowing module, too, was the same as in FIG. 2.

As can be appreciated from the comparison of both, the rise of the sidelight in the invention (FIG. 5(a)) (that is, the rise of laser gain) is slower than that in the prior art (FIG. 5(b)), and the ASE component is not found in the laser pulse waveform as well. When the rise time (0 ns) of the sidelight is thought of as the starting point, the rise starting time of the laser pulse waveform is slower in the present invention (FIG. 5(a)) than in the prior art (FIG. 5(b)).

With the slowing of sidelight rise (the slowing of laser gain rise) the ASE component could thus be cut off probably for the following reasons. As explained above, the rise of the sidelight (the rise of laser gain) is so early in the prior art (FIG. 2) that light generated by discharge is rapidly amplified. The light amplified without making round trips in the laser resonator is extracted as the ASE before the light is taken out of the laser resonator in the form of a laser beam exceeding a given threshold value.

In the present invention (FIG. 5(a)), on the other hand, the rise of the sidelight (the rise of laser gain) is so slow that light generated by discharge is gently amplified. The light then makes round trips in the laser resonator without being not so rapidly amplified as extracted as the ASE out of the laser resonator, and is in the long run extracted out of the laser resonator in the form of a laser beam exceeding a given threshold value. Thus, the ASE is not found in the light emitted out of the laser system.

Figure 2:
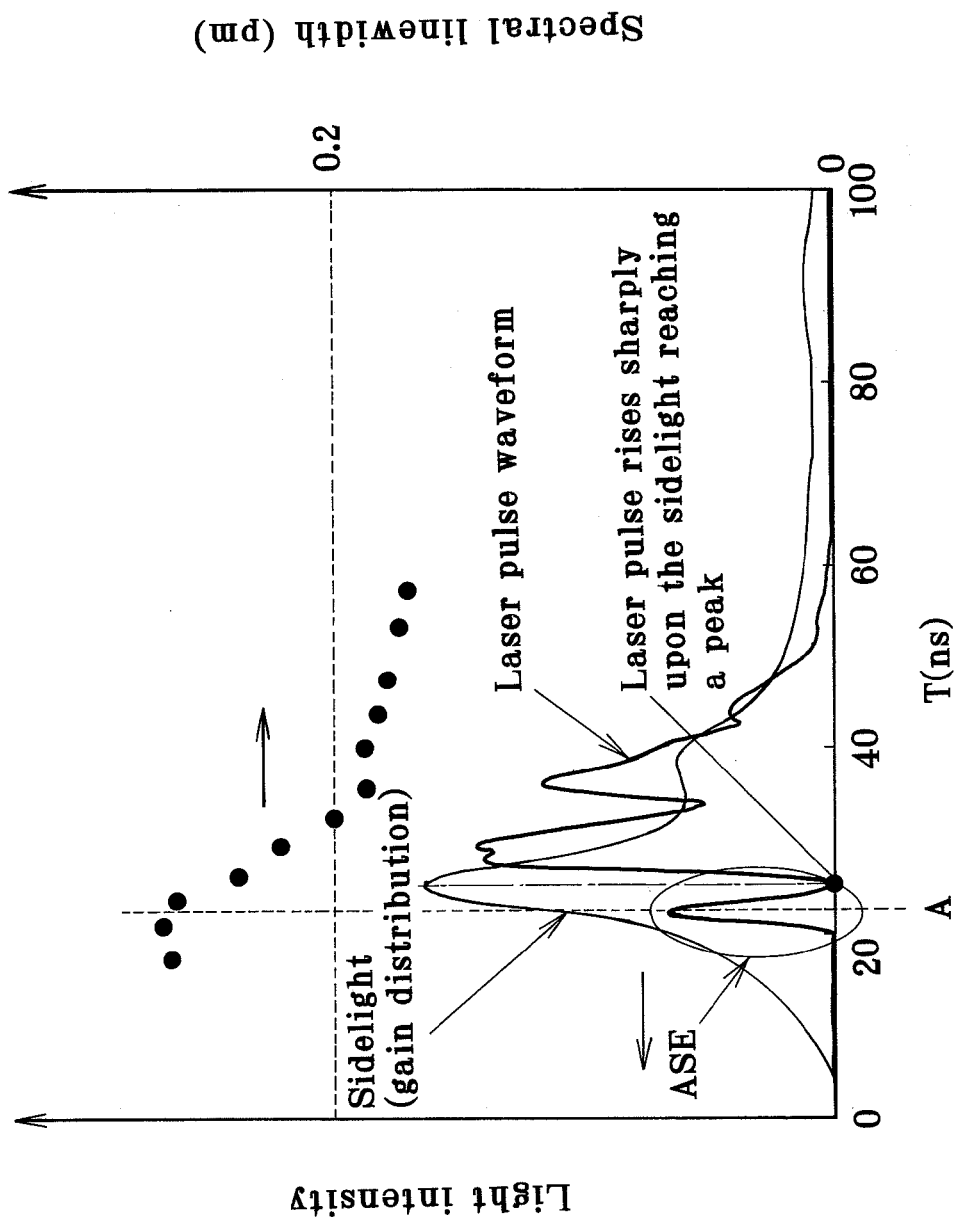
FIG. 2 is a plot illustrative of the progressions over time of the sidelight, the waveform of laser pulses, and the spectral linewidth of a conventional line-narrowing molecular fluorine laser system.

As one means for achieving line narrowing, it has so for been proposed to stretch the waveform of laser pulses. With this means, however, it is often difficult to attain a spectral linewidth of 0.2 pm or less and a spectral purity of 0.5 pm or less because, although depending on the conditions involved, the ASE component is included in a laser pulse waveform as shown in FIG. 2.

On the other hand, the inventors have found that by controlling the rise of the sidelight (the rise of laser gain) to which no consideration has been given, it is possible to suppress the occurrence of the ASE as mentioned above. The inventors have also found that by appropriate control of the performance of the line-narrowing module used, appropriate setting of the laser resonator used, stretching of the laser pulse width used, etc., it is possible to achieve a line-narrowed $F_2$ laser system that can satisfy the spectral linewidth and spectral purity requirements needed for a dioptric type of aligner light sources.

Figure 6:
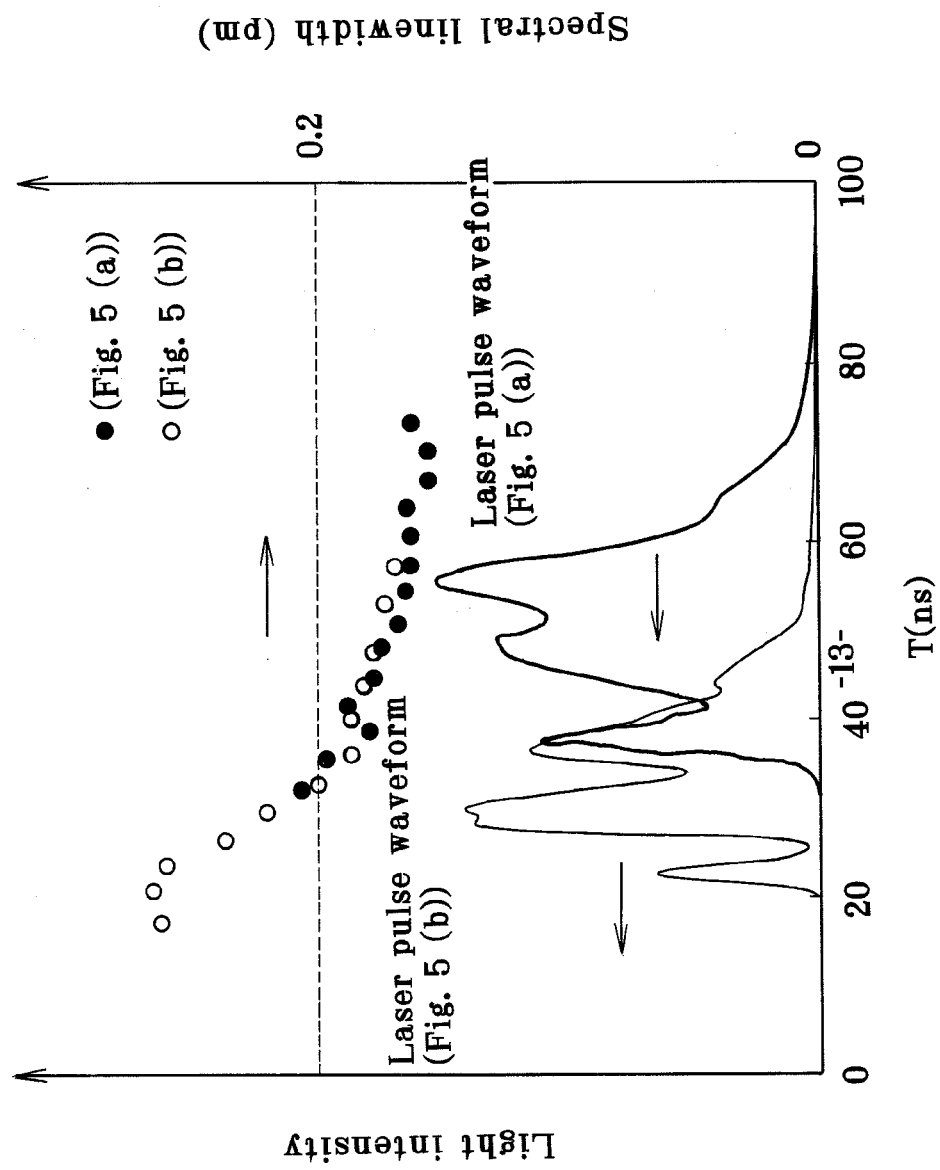
FIG. 6 is a diagrammatic summary of the progression over time of the spectral linewidth and the laser pulse waveform shown in FIGS. 5(a) and 5(b).

Here the progression over time of the spectral linewidth and the laser pulse waveform shown in FIGS. 5(a) and 5(b) may be diagrammatically summarized as shown in FIG. 6.

The rise of the sidelight (the rise of laser gain) is slow in the present invention (FIG. 5(a)), and so the speed of amplification of the light generated by discharge is slow. When the starting point is defined by the time at which the sidelight rises, therefore, the rise starting time of the laser pulse waveform is slower in the present invention (FIG. 5(a)) than in the prior art (FIG. 5(b)), as can be seen from FIG. 6.

As shown in FIG. 6, the progressions over time of the spectral linewidths in the prior art (FIG. 2 and FIG. 5(b)) and the present invention (FIG. 5(a)) are found on much the same curve, and at the time the laser pulse waveform of the present invention rises, the spectral line has much the same linewidth as that at the same time in the prior art.

In other words, until the light generated after the start of discharge (after the start of sidelight emission) is taken out of the laser resonator in the form of a laser beam (until the laser pulse rises), the light making round trips in the laser resonator have made several passes through the line-narrowing module, and so the bandwidth of the light is considered to have been narrowed to some extents.

By controlling the rise of the sidelight (the rise of laser gain) so that the laser pulse rises after the light in the laser resonator has been narrowed to a given spectral linewidth, it is thus possible to narrow the spectral linewidth (the integral) to a given value and improve on the spectral purity as well.

To sum up, the inventors have found that by control of the rise of the sidelight (the rise of laser gain) to which no consideration has so far been given, it is possible to suppress the occurrence of the ASE and generate a laser beam narrowed to some extents from the point of generation of laser pulses and, hence, it is possible to provide a line-narrowed $F_2$ laser system that satisfies the spectral linewidth and purity requirements needed for a dioptric type of aligner light sources.

Figure 3A:
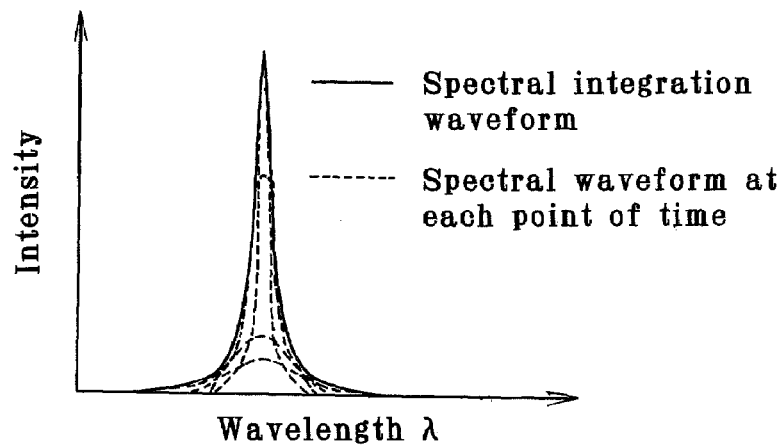
FIGS. 3(a) and 3(b) are illustrative of the changes over time and components of a spectral linewidth within one laser pulse.
Figure 3B:
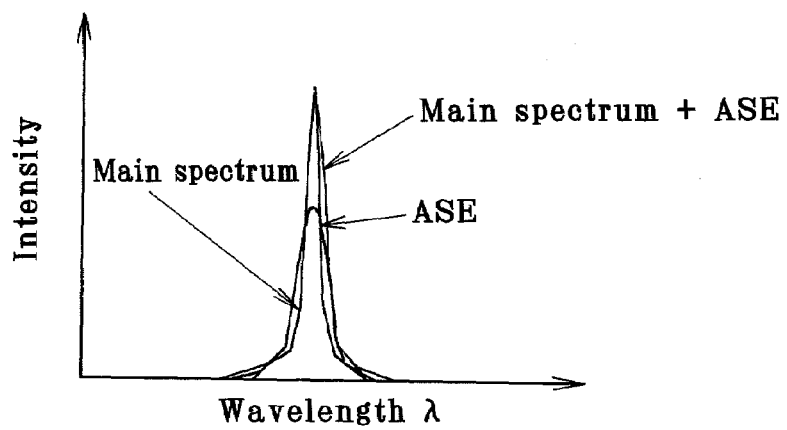
Figure 4:
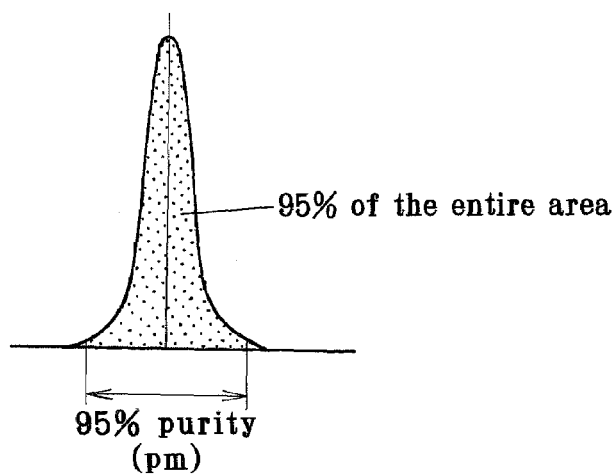
FIG. 4 is illustrative of a 95% purity.
Figure 7:
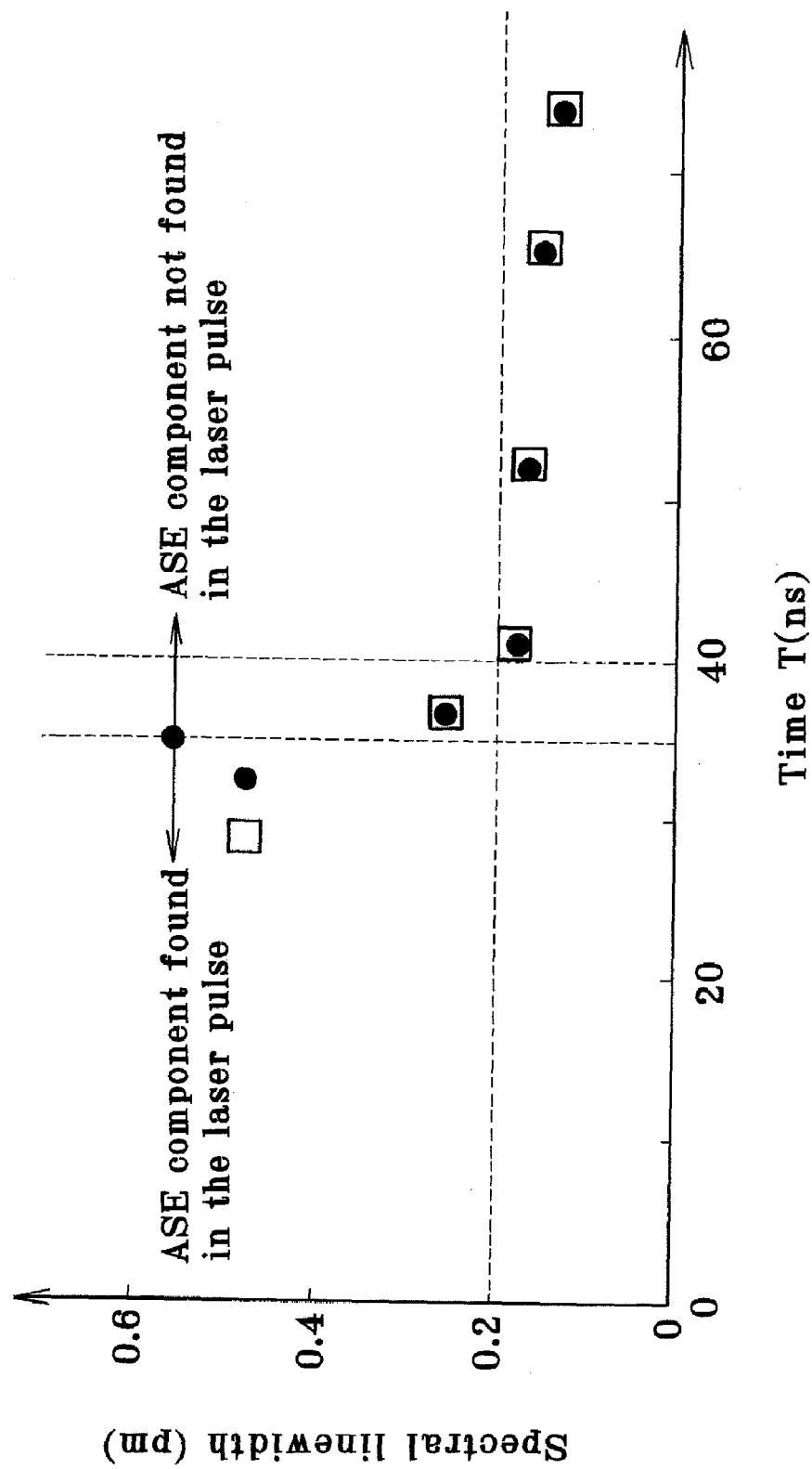
FIG. 7 is illustrative of the spectral linewidth (FWHM) of a laser pulse versus the time from the start of sidelight emission to the generation of the first sidelight peak and the starting point of the ASE-containing laser pulse waveform.

FIG. 7 is illustrative of the spectral linewidth (FWHM) of a laser pulse versus the time (black spots) from the start of sidelight emission to the generation of the first sidelight peak and the starting point of the ASE-containing laser pulse waveform (squares). Here the spectral linewidth (FWHM) shown in FIG. 7 is understood to refer to the integral over time of each spectral linewidth at each point of time in such a laser pulse as shown in FIG. 3. It is noted that the laser resonator built up of a diffraction grating and an output mirror had a length of 1,500 mm.

Since it is difficult to precisely determine the starting point of the sidelight waveform and the laser pulse waveform from those waveforms themselves, suppose now that the starting point of the sidelight waveform, and the laser pulse waveform is defined as the point of time before the generation of the first peak of each waveform and 5% of the first peak intensity are attained. It is understood, however, that there is a very slight intensity difference between the point of time less than 5% of the intensity are attained, for instance, 1% of the intensity is attained and the point of time 5% of the intensity are attained; any point of time before the generation of the first peak of each waveform and less than 5% of the first peak intensity are attained may be defined as the starting point of the sidelight waveform, and the laser pulse waveform.

Observations of the laser pulse waveform upon measured as in FIG. 7 have indicated that when the first pulse of the sidelight appears before about 35 nm from the starting point of the sidelight as defined above, the ASE component is contained in the laser pulse waveform. At this time, it has also been observed that the starting point of the laser pulse waveform appears before the point of time of the first peak of the sidelight, as shown in FIG. 2.

On the other hand, it has been observed that when the first pulse of the sidelight appears after about 35 ns from the starting point of the sidelight, no ASE component is contained in the laser pulse waveform. At this time, it has also been observed that the starting point of the laser pulse waveform appears in the vicinity of or subsequent to the point of time of the first peak of the sidelight, as shown in FIG. 5(a).

As can be seen from FIG. 7, it has been observed that when the first peak of the sidelight appears after 40 ns from the starting point of the sidelight, the spectral linewdith becomes below 0.2 pm. Although not shown in FIG. 7, it has also been observed that the spectral purity becomes 0.5 pm or less.

To sum up, it has been found that when the rise of the sidelight is made so gentle that the starting point of the laser pulse appears after the point of time of the first peak of the sidelight, no ASE component is contained in the laser pulse waveform.

Control of the rise of the sidelight (for control of suppression of the ASE) according to the present invention is now explained.

As described above, the features of the present invention are that the occurrence of the ASE is suppressed by control of the rise of the sidelight and the rise of the laser pulse is delayed until light making round trips in the laser resonator is narrowed to a given linewidth value or below.

According to the present invention, it has been found that the following parameters contribute primarily to control of the rise of the sidelight (control of the rise of the laser pulse).

(1) Applied Voltage

Figure 8:
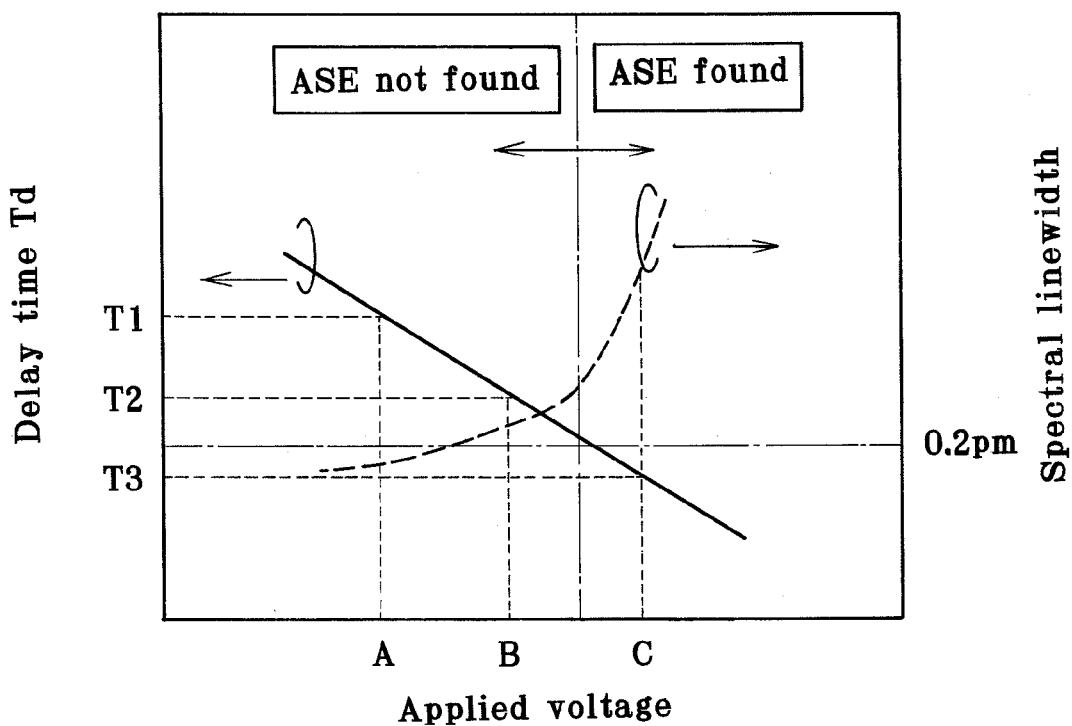
FIG. 8 is illustrative of a spectral linewidth and a delay time Td from the starting point of the rise of the sidelight to the starting point of the rise of the laser pulse upon changes in the applied voltage.

FIG. 8 is illustrative of a spectral linewidth and a delay time Td from the starting point of the rise of the sidelight to the starting point of the rise of the laser pulse upon changes in the voltage applied from a high-voltage pulse generator to the electrodes when the same line-narrowing module is used under the same gas conditions (the same gas mixing ratio and pressure in the laser chamber).

As the voltage applied from the high-voltage pulse generator to the electrodes becomes low, the delay time Td becomes slow as shown in FIG. 8. In other words, with decreasing applied voltage, the laser gain decreases and the starting point of the rise of the laser pulse delays.

From FIG. 8, it is seen that at an applied voltage C having a large voltage value, the ASE occurs due to an increased gain, the delay time is as short as T3, and the spectral linewidth exceeds 0.2 pm.

At an applied voltage B, no ASE occurs because the voltage value is smaller than that at the applied voltage C. The then delay time is T2 that is longer than T3; however, the spectral linewidth exceeds 0.2 pm because of an insufficient number of the round trip of light in the laser resonator.

At an applied voltage A, on the other hand, no ASE again occurs because the voltage value is much smaller than that at the applied voltage B. The then delay time is T1 that is longer than T2, and the spectral linewidth is below 0.2 pm because of a sufficient number of the round trip of light in the laser resonator.

By control of the voltage applied from the high-voltage pulse generator to the electrodes when the same line-narrowing module is used under the same gas conditions, it is thus possible to control the rise time of the sidelight thereby suppressing the occurrence of the ASE, and control the delay time Td from the starting point of the rise of the sidelight to the starting point of the rise of the laser pulse in such a way that the laser pulse rises upon narrowed to a sufficient level.

(2) $F_2$ Concentration

Figure 9:
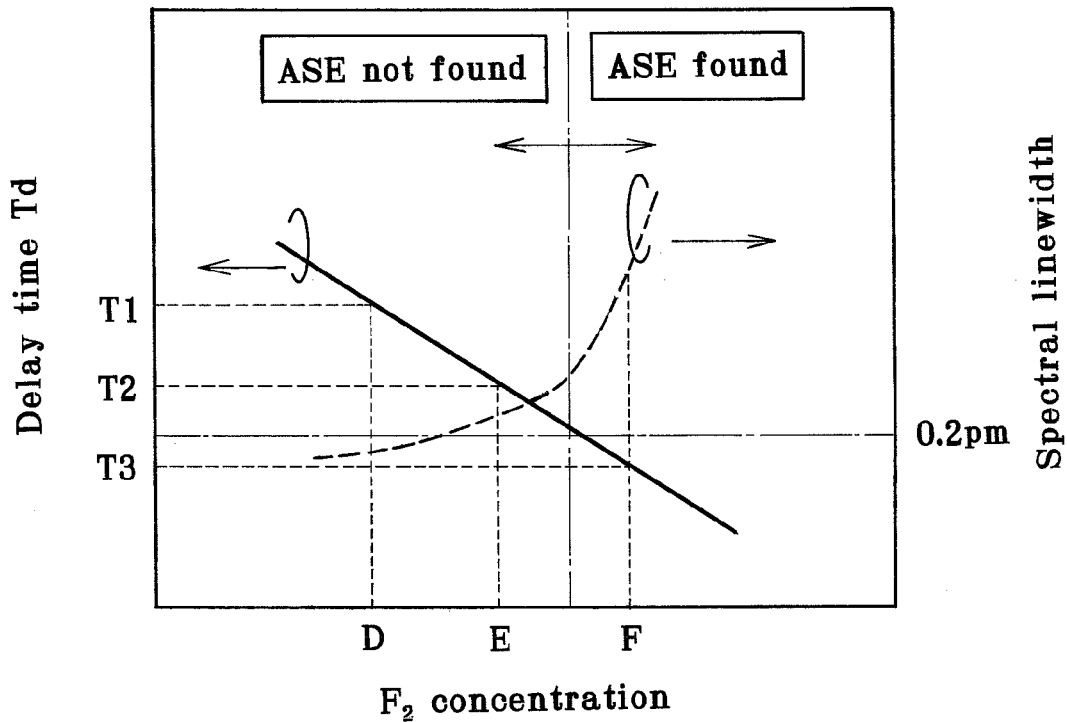
FIG. 9 is illustrative of a spectral linewidth and a delay time Td from the starting point of the rise of the sidelight to the starting point of the rise of the laser pulse upon changes in the concentration of $F_2$.

FIG. 9 is illustrative of a spectral linewidth and a delay time Td from the starting point of the rise of the sidelight to the starting point of the rise of the laser pulse upon changes in the concentration of $F_2$ in the laser gas when the same line-narrowing module is used at the same applied voltage and the same gas pressure.

As the concentration of $F_2$ in the laser gas decreases, the delay time Td becomes slow as shown in FIG. 9. In other words, with a decreasing $F_2$ concentration in the laser gas, the laser gain decreases and the starting point of the rise of the laser pulse delays.

From FIG. 9, it is seen that at a high $F_2$ concentration F, the ASE occurs due to an increased gain, the delay time is as short as T3, and the spectral linewidth exceeds 0.2 pm.

At a concentration E, no ASE occurs because the $F_2$ concentration is lower than the concentration F. The then delay time is T2 that is longer than T3; however, the spectral linewidth exceeds 0.2 pm because of an insufficient number of the round trip of light in the laser resonator.

At a concentration D, on the other hand, no ASE again occurs because the $F_2$ concentration is lower than the concentration B. The then delay time is T1 that is longer than T2, and the spectral linewidth is below 0.2 pm because of a sufficient number of the round trip of light in the laser resonator.

By control of the concentration of $F_2$ contained in the laser gas when the same line-narrowing module is used at the same applied voltage and the same gas pressure, it is thus possible to control the rise time of the sidelight thereby suppressing the occurrence of the ASE, and control the delay time Td from the starting point of the rise of the sidelight to the starting point of the rise of the laser pulse in such a way that the laser pulse rises upon narrowed to a sufficient level.

(3) Laser Gas Pressure

Figure 10:
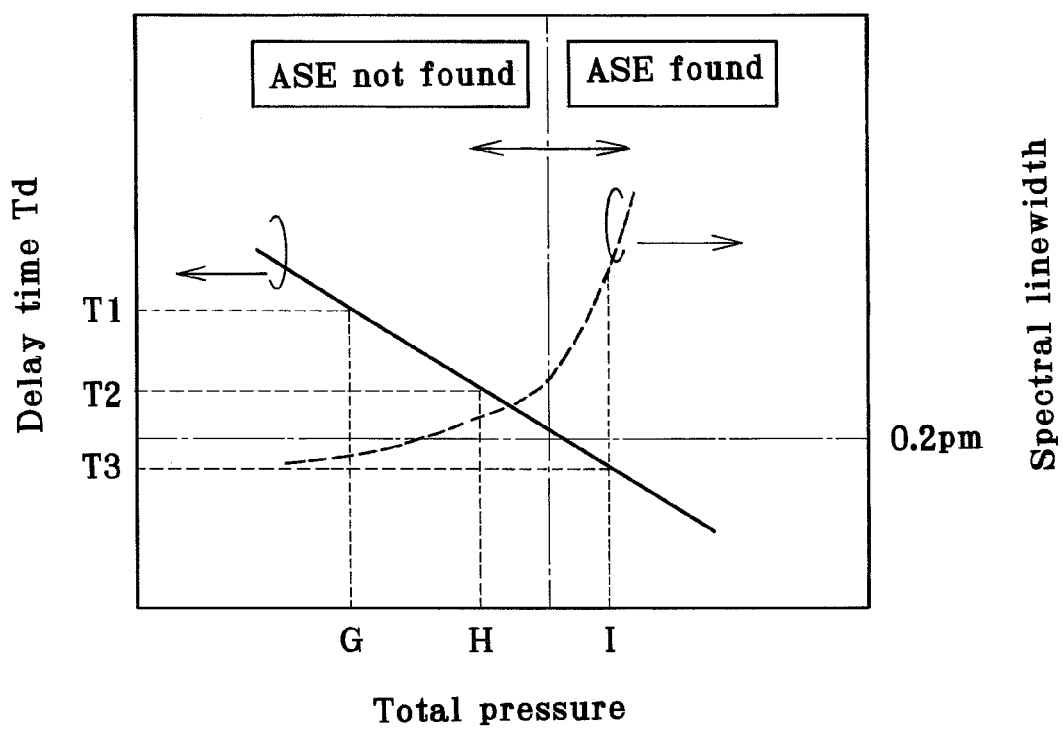
FIG. 10 is illustrative of a spectral linewidth and a delay time Td from the starting point of the rise of the sidelight to the starting point of the rise of the laser pulse upon changes in the laser gas pressure

FIG. 10 is illustrative of a spectral linewidth and a delay time Td from the starting point of the rise of the sidelight to the starting point of the rise of the laser pulse upon changes in the laser gas pressure (hereinafter called the total pressure) in the laser chamber when the same line-narrowing module is used at the same applied voltage and the same $F_2$ concentration.

As the total pressure becomes low, the delay time Td becomes slow as shown in FIG. 10. In other words, with decreasing total pressure, the laser gain decreases and the starting point of the rise of the laser pulse delays.

From FIG. 10, it is seen that at a total pressure I having a large pressure value, the ASE occurs due to an increased gain, the delay time is as short as T3, and the spectral linewidth exceeds 0.2 pm.

At a total pressure H, no ASE occurs because the total pressure is lower than the total pressure I. The then delay time is T2 that is longer than T3; however, the spectral linewidth exceeds 0.2 pm because of an insufficient number of the round trip of light in the laser resonator.

At a total pressure G, on the other hand, no ASE again occurs because the total pressure is much lower than the total pressure H. The then delay time is T1 that is longer than T2, and the spectral linewidth is below 0.2 pm because of a sufficient number of the round trip of light in the laser resonator.

By control of the total pressure when the same line-narrowing module is used at the same applied voltage and the same $F_2$ concentration, it is thus possible to control the rise time of the sidelight thereby suppressing the occurrence of the ASE, and control the delay time Td from the starting point of the rise of the sidelight to the starting point of the rise of the laser pulse in such a way that the laser pulse rises upon narrowed to a sufficient level.

Specific examples of how to control the rise of the sidelight as mentioned above are now given.

Figure 11:
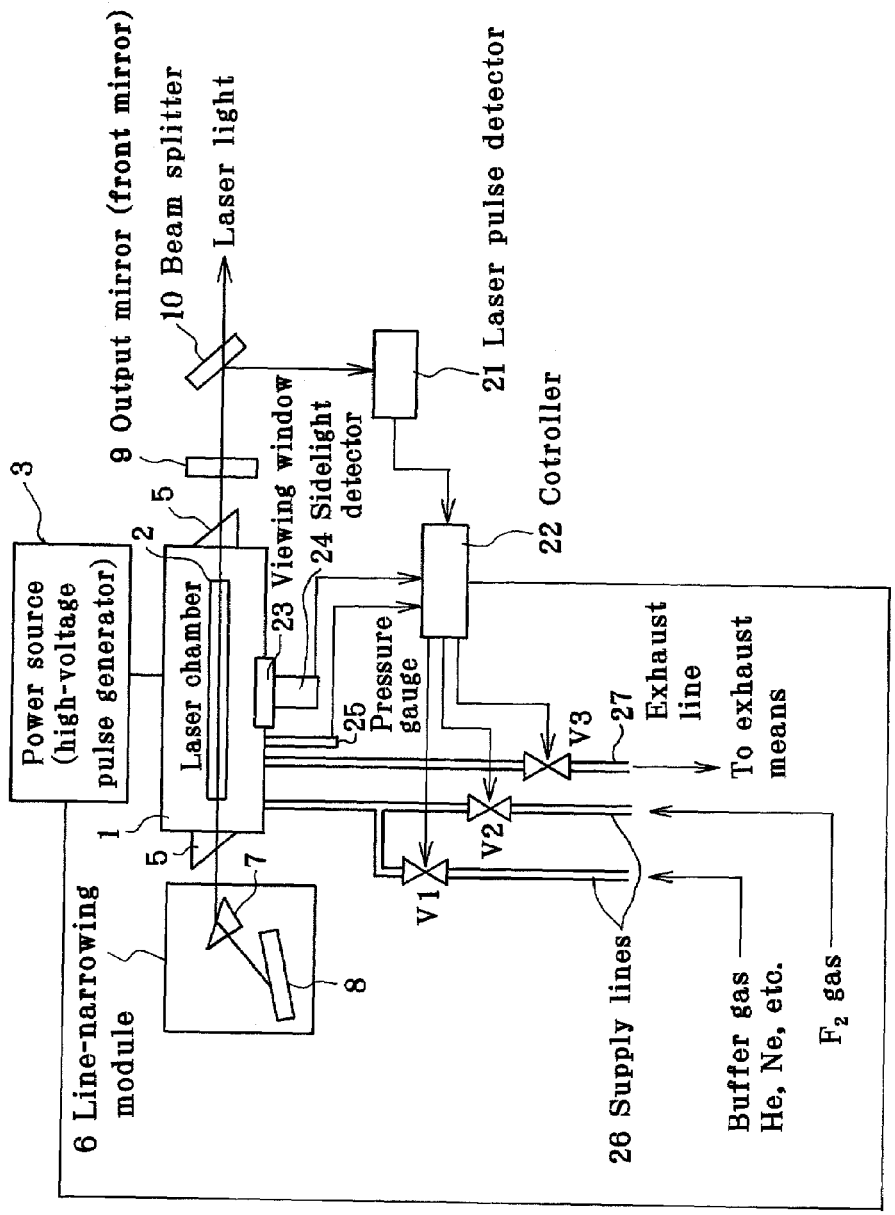
FIG. 11 is illustrative of one exemplary construction of the line-narrowed $F_2$ laser system of the invention.

FIG. 11 is illustrative of one exemplary construction of the line-narrowed $F_2$ laser system of the invention. Parts common to FIG. 1 are not explained because of having equivalent functions.

The laser chamber 1 is connected with a gas supply line 26 for supplying $F_2$ gas or a buffer gas such as rare gas in the laser chamber 1 and an exhaust line 27 for exhausting the gas from the laser chamber 1.

The gas supply line 26 is composed of a line for supplying the $F_2$ gas and a line for supplying the buffer gas such as rare gas. The line for supplying the buffer gas such as rare gas is connected to a buffer gas supply source (not shown) by way of a valve V1, and the $F_2$ gas supply line is connected to an $F_2$ gas supply source (not shown) by way of a valve V2. It is noted that since the $F_2$ gas has very high reactivity, the $F_2$ gas from the $F_2$ gas supply source is supplied in a form diluted with rare gas or the like.

These two lines are combined together on the downstream side of the valves V1 and V2 for connection to the laser chamber 1.

The exhaust line 24 is connected to an exhaust means (not shown) by way of a valve V3.

A controller 22 controls the closing and opening of the valves V1, V2 and V3 for supplying the gas to and exhausting the gas from the laser chamber 1.

The laser chamber 1 is provided on one side (at an electrode side position in a substantially vertical direction to the longitudinal direction of the electrodes 2) with a viewing window 23 for viewing the sidelight. The pulse waveform over time of the sidelight is measured by a sidelight detector 24, and the ensuing measurement data are sent out to the controller 22.

On the other hand, a part of a laser beam emerging from the output mirror 9 is measured by means of a laser pulse detector 21 through a beam splitter 10, and the ensuing measurement data are sent out to the controller 22.

The controller 22 controls the high-voltage pulse generator 3, thereby controlling the value of the voltage applied to the electrodes 2.

The laser chamber 1 is equipped with a pressure gauge 25 for measuring the pressure of the laser gas in the laser chamber 1, and the ensuring pressure data are sent out to the controller 22.

Figure 12:
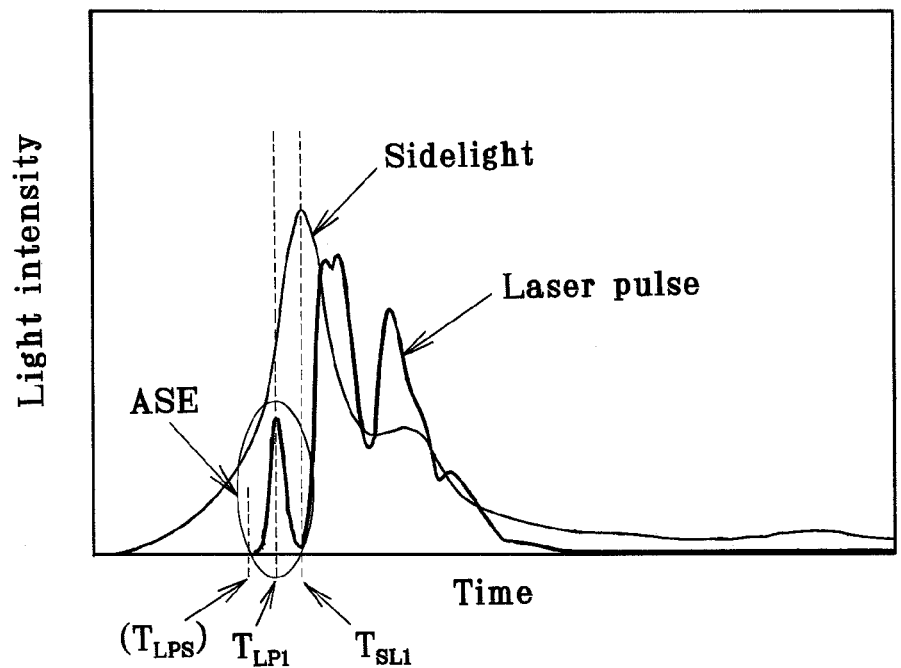
FIG. 12 is illustrative of the laser pulse waveform and the sidelight waveform as observed upon the occurrence of the ASE, i.e., when $T_{SL1} > T_{LP1}$ where $T_{SL1}$ is the first peak time of the sidelight and $T_{LP1}$ is the first peak time of the laser pulse.
Figure 13:
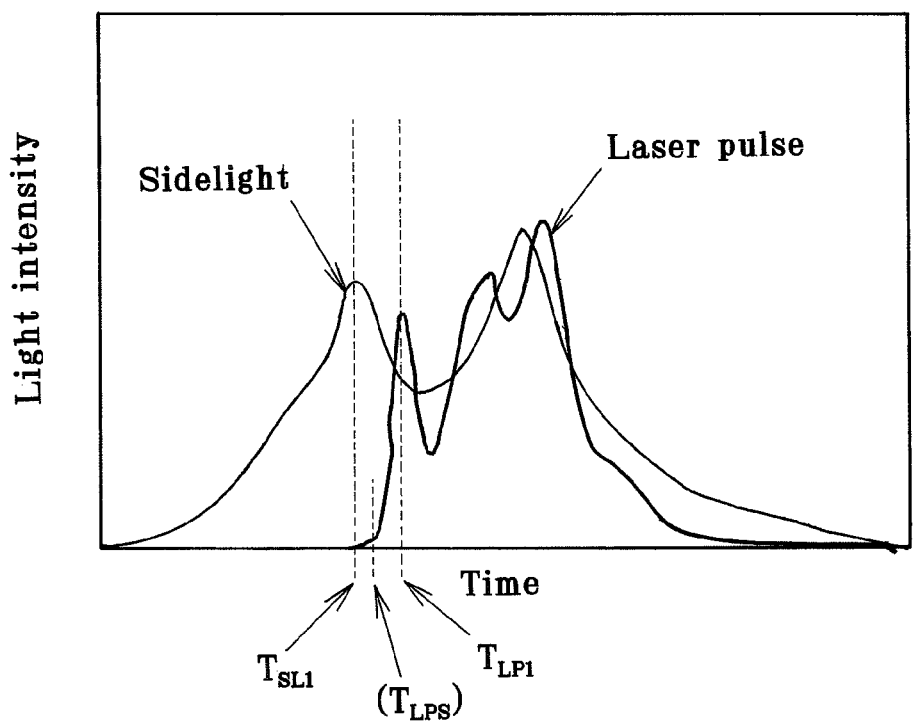
FIG. 13 is illustrative of the laser pulse waveform and the sidelight waveform as observed when the ASE des not occur, i.e., when $T_{SL1} \leq T_{LP1}$ where $T_{SL1}$ is the first peak time of the sidelight and $T_{LP1}$ is the first peak time of the laser pulse.

In this connection, the inventors have obtained the following findings through close analyses of the results of experimentation, etc. That is, from the comparison of the first peak time $T_{SL1}$ of the sidelight with the first peak time $T_{LP1}$ of the laser pulse as shown in FIGS. 12 and 13, it has been found that if $T_{SL1} > T_{LP1}$, then the ASE occurs (FIG. 12), and if $T_{SL1} \leq T_{LP1}$, then the ASE does not occur (FIG. 13). In FIGS. 12 and 13, it is noted that $T_{LPS}$ is the starting point of the laser pulse. Based on such findings, the occurrence of the ASE is suppressed by such control as explained below.

(1) Voltage Control

Figure 14:
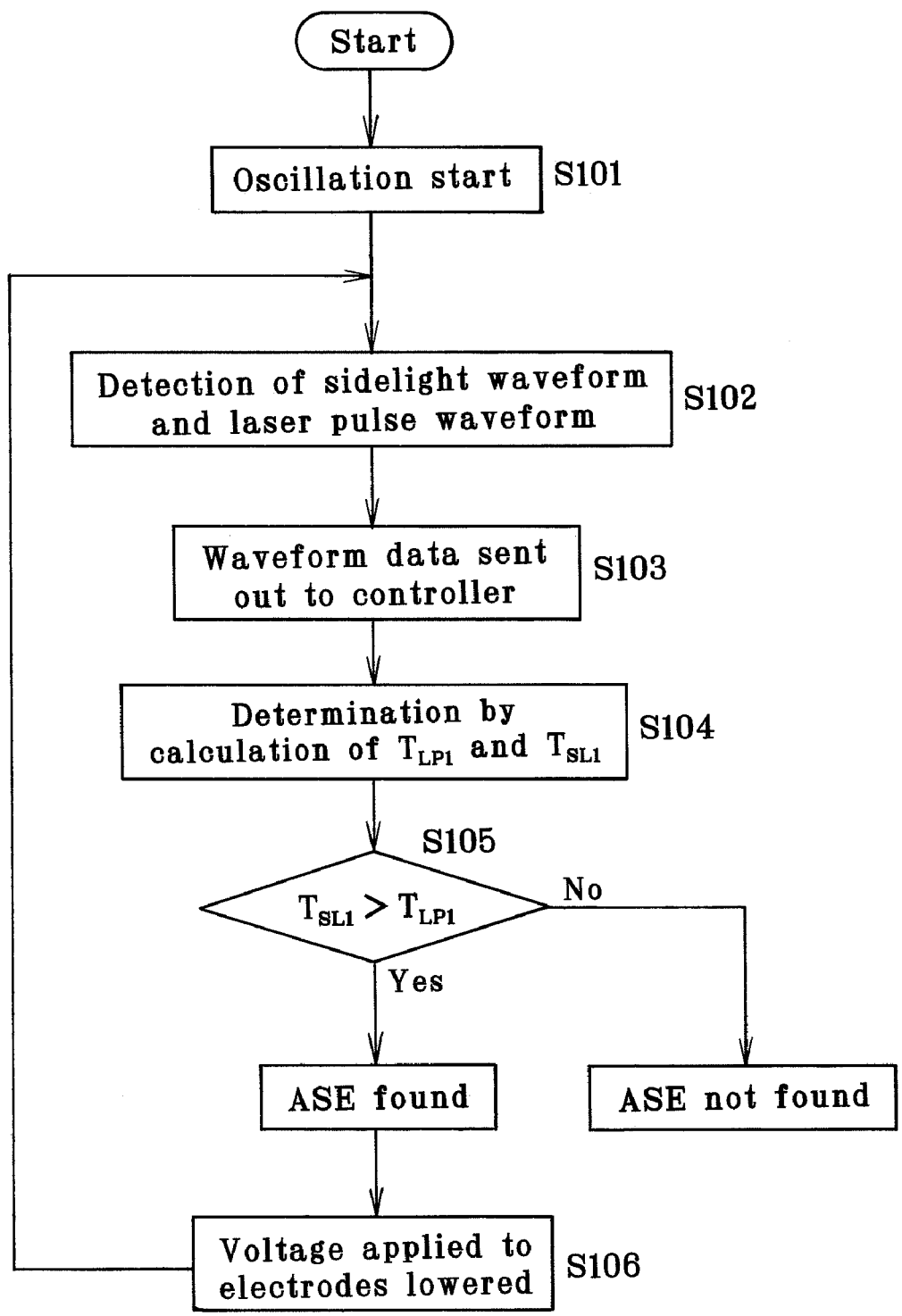
FIG. 14 is a flowchart of one embodiment of how the occurrence of the ASE is suppressed by voltage control.

FIG. 14 is a flowchart of how the occurrence of the ASE is suppressed by voltage control. First, the controller 22 gives a command to the high-voltage pulse generator 3 (hereinafter called the power source) to generate laser discharge, thereby initiating laser oscillation (step S101).

Then, the pulse waveforms over time of the sidelight and laser pulse are detected by the sidelight detector 24 and laser pulse detector 21 (step S102), and the ensuing detection data are sent out to the controller 22 (step S103).

Then, the controller 22 receives the waveform data to determine by calculation the first peak time $T_{SL1}$ of the sidelight and the first peak time $T_{LP1}$ of the laser pulse with the origin defined by the starting point of the sidelight (step S104), so that $T_{SL1}$ is compared with $T_{LP1}$ in terms of magnitude (step S105).

If $T_{SL1} \leq T_{LP1}$, then the ASE is assumed to be not found. If $T_{SL1} > T_{LP1}$, on the other hand, the ASE does not occur because the voltage applied to the electrodes 2 is below a given value as shown in FIG. 8. Then, the controller 22 gives a command to the power source 3 to lower the voltage applied to the electrodes 2 by a given value (step S106).

Until the ASE is cut off, these steps S101 to S106 are then repeated.

(2) $F_2$ Concentration Control, and Total Pressure Control

In the aforesaid voltage control mode (1), the occurrence of the ASE is suppressed by control of the voltage applied to the electrodes 2. As can be seen from FIGS. 9 and 10, however, it is acceptable to control the concentration of $F_2$ in the laser gas or the pressure of the laser gas, thereby suppressing the occurrence of the ASE.

Figure 15:
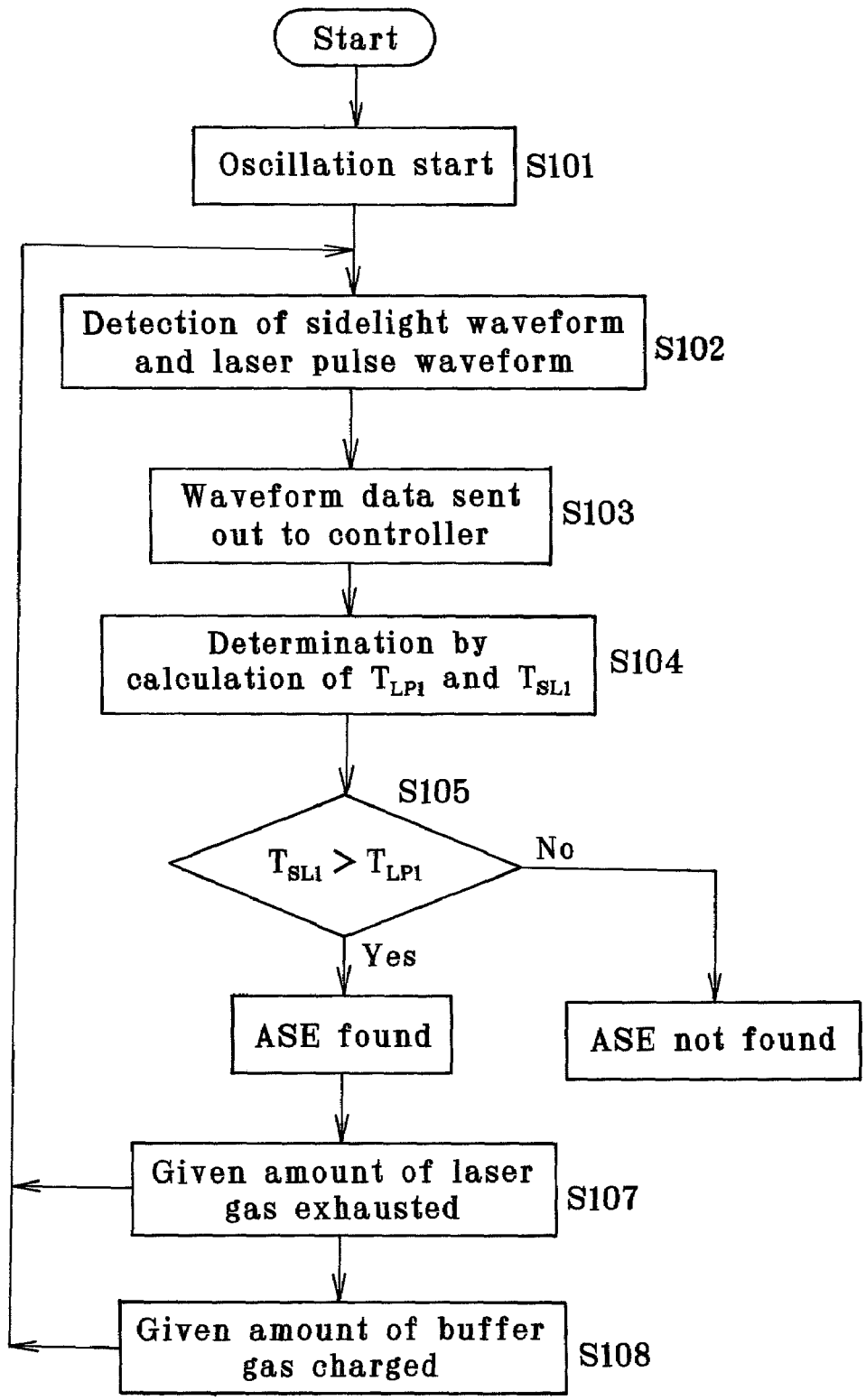
FIG. 15 is a flowchart of one embodiment of how the occurrence of the ASE is suppressed by control of $F_2$ concentration and total pressure.

In the $F_2$ concentration control mode, steps S101 to S105 of FIG. 15 (the same as steps S101 to S105 of FIG. 14) are implemented as in the voltage control mode. If $T_{SL1} > T_{LP1}$ in step S105, the controller 22 opens the valve V3 while monitoring pressure data from the pressure gauge 25, thereby exhausting the laser gas from the laser chamber 1, and upon the laser gas pressure reaching a given pressure, the controller 22 closes the valve V3 (step S107).

Thereafter, the controller 22 opens the valve V1 while monitoring pressure data from the pressure gauge 25 (during which the valve V2 remains closed), thereby charging the buffer gas in the laser chamber 1. Upon the laser gas pressure reaching a given pressure, the controller 22 closes the valve V1 (step S108).

That is, a given amount of the laser gas is exhausted from the laser chamber and the same amount of the buffer gas is charged in the laser chamber, whereby the concentration of $F_2$ in the laser gas is decreased.

These steps S101 to S108 are then repeated until the ASE is cut off.

It is noted that to control the laser gas pressure thereby suppressing the occurrence of the ASE, the step S108 may be omitted from a series of steps S101 to S108.

As already explained with reference to FIG. 7, when the rise of the sidelight is made so gentle that the starting point of the laser pulse is allowed to appear after the first peak of the laser pulse appears, the ASE component is unlikely to be included in the laser pulse waveform. In other words, whether or not the ASE occurs may be determined by comparing the first peak time $T_{SL1}$ of the sidelight with the starting point $T_{LPS}$ of the laser pulse (FIGS. 12 and 13). Specifically, this is achieved by using the starting point $T_{LPS}$ of the laser pulse in place of the first peak time $T_{LP1}$ of the laser pulse in the aforesaid control mode.

While the starting point $T_{LPS}$ of the laser pulse waveform has been defined as the point of time before the appearance of the first peak of the laser pulse waveform and 5% of the first peak intensity are attained, it is understood that it may be defined as any point of time before the appearance of the first peak of the laser pulse waveform and less than 5% of the first peak intensity are attained.

As described above, it has been found that whether or not the ASE occurs can be determined through the results of comparison of the first peak time $T_{SL1}$ of the sidelight with the first peak time $T_{LP1}$ of the laser pulse. However, the testing by the inventors has also revealed that whether or not the ASE occurs can be determined by another determination method, as described below.

Figure 16:
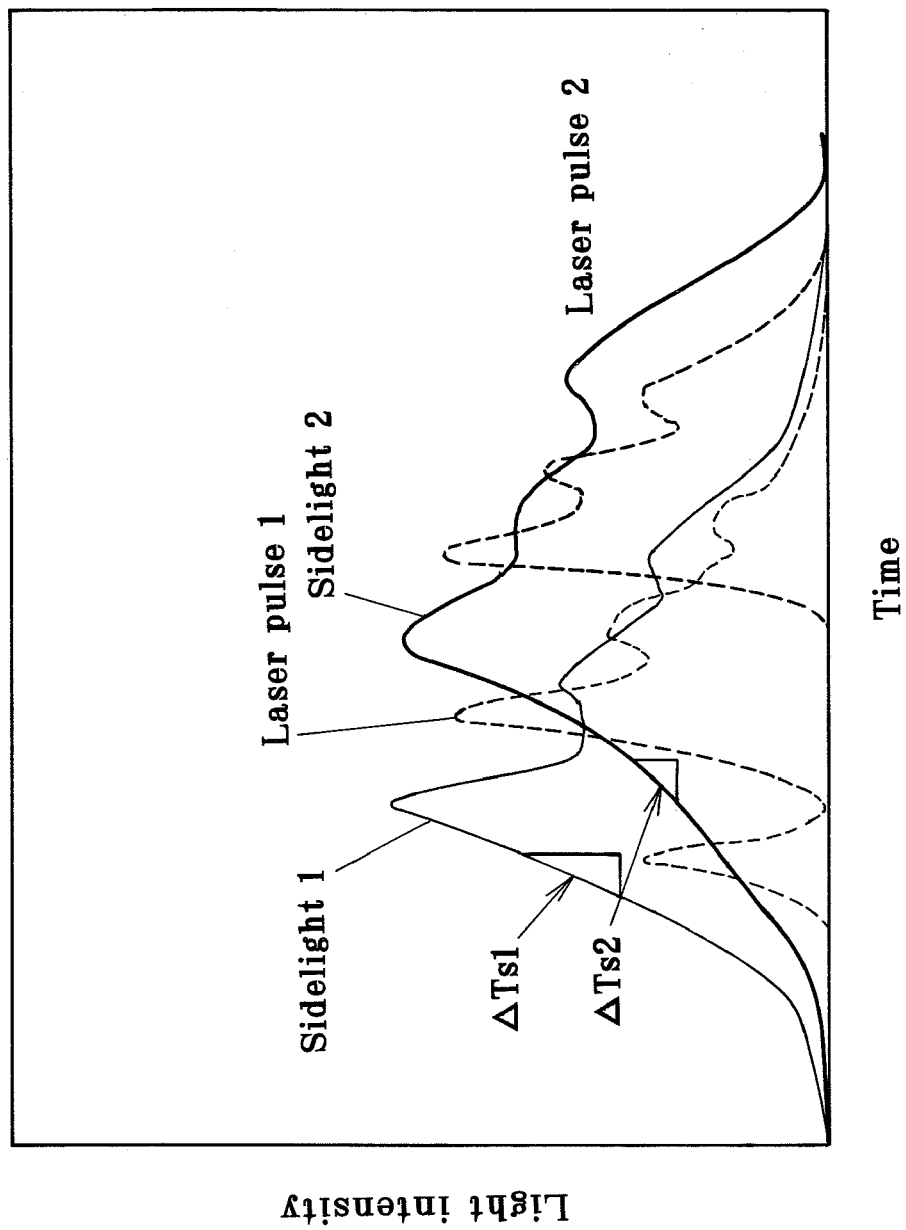
FIG. 16 is illustrative of the maximum gradient $\Delta T_s$ of the rising edge of the sidelight and the laser pulse waveform.

That is, the testing by the inventors has indicated that the ASE occurs upon the maximum gradient $\Delta T_s$ of the rising edge of the sidelight exceeding a given value $\Delta T_1$. As can be seen form the sidelight waveform and laser pulse waveform shown in FIG. 16, the ASE is included in a laser pulse 1 obtained in the case of the sidelight 1. The then maximum gradient $\Delta T_s$ of the rising edge of the sidelight is given by $\Delta T_{s1}$ that has a relation to the given value $\Delta_{T1}$ as represented by $\Delta T_1 < \Delta T_{s1}$.

On the other hand, the ASE is not included in a laser pulse 2 obtained in the case of the sidelight 2. The then maximum gradient $\Delta T_s$ of the rising edge of the sidelight is given by $\Delta T_{s2}$ that has a relation to the given value $\Delta_{T1}$ as represented by $\Delta T_1 \geq \Delta_{Ts2}$.

Thus, whether or not the ASE occurs can be determined from the magnitude of the measured maximum gradient $\Delta T_s$ of the rising edge of the sidelight with respect to the given $\Delta T_1$.

The maximum gradient $\Delta T_s$ of the rising edge of the sidelight, too, varies depending the gain of the laser-inducing medium as is the case with the rise time of the sidelight. A low gain causes $\Delta T_s$ to become gentle whereas a high gain renders $\Delta T_s$ sharp. The control parameters for the maximum gradient $\Delta T_s$ of the rising edge of the sidelight are applied voltage, $F_2$ concentration, and total pressure as already mentioned.

On the basis of the aforesaid finding in this case, the occurrence of the ASE is suppressed by the following control modes.

(1) Voltage Control

Figure 17:
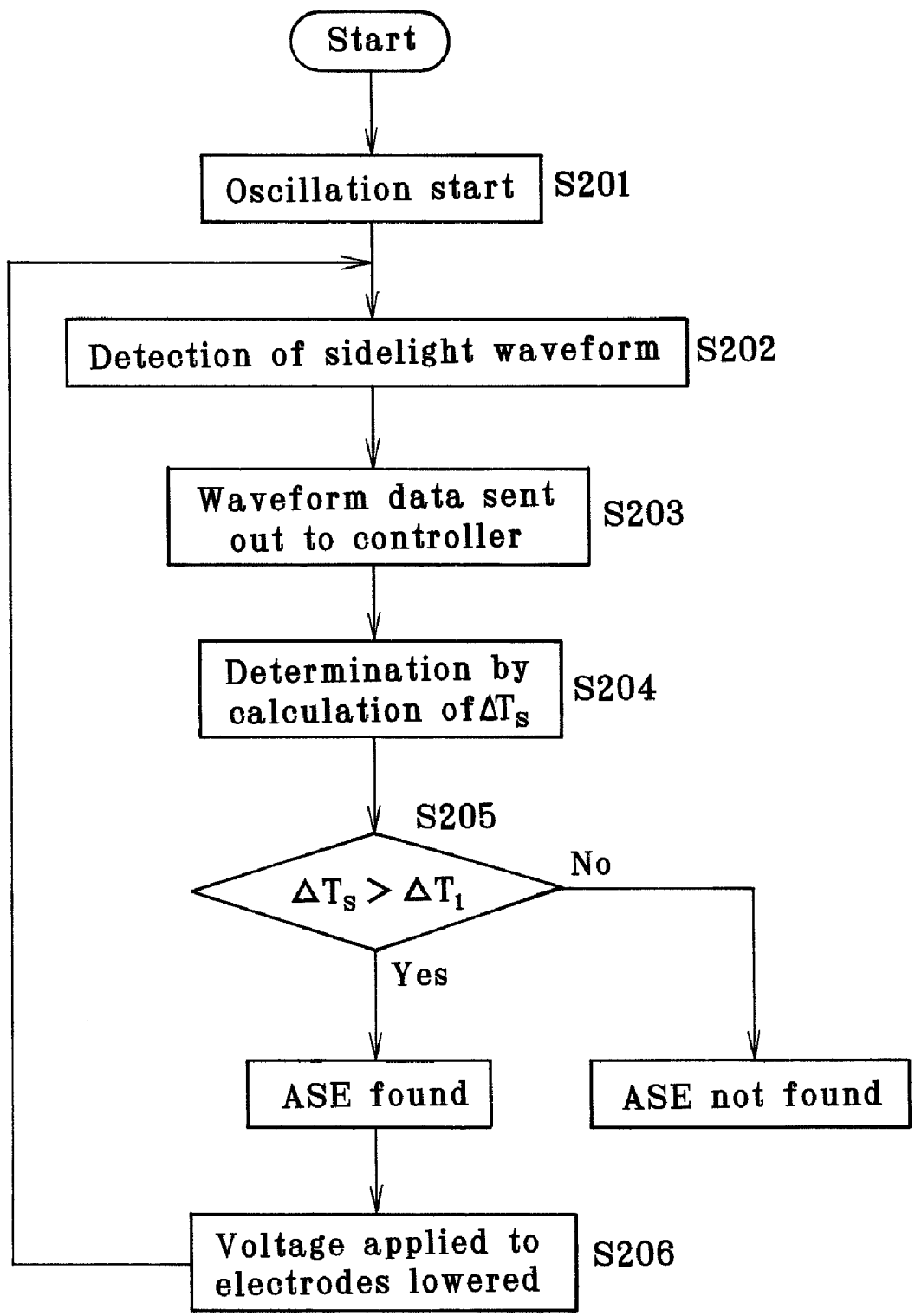
FIG. 17 is a flowchart of another embodiment of how the occurrence of the ASE is suppressed by voltage control.

FIG. 17 is a flowchart one embodiment of how the occurrence of the ASE is suppressed by voltage control.

The aforesaid given value $\Delta T_1$ is dependent on the performance of the line-narrowing module 6 (for instance, the expanding factor of the expanding prism 7 and the blaze angle of the diffraction grating 8), and the length of the laser resonator. The controller 22 stores ahead the given value $\Delta T_1$ obtained on the basis of these depending conditions of the laser system.

First, the controller 22 gives a command to the power source 3 to generate laser discharge, thereby starting laser oscillation (step S201).

Then, the pulse waveform over time of the sidelight is detected by the sidelight detector 24 (step S202), and the ensuing detection data are sent out to the controller 22 (step S203).

Then, the controller 22 receives waveform data to determine by calculation the maximum gradient $\Delta T_s$ of the rising edge of the sidelight from the range from the starting point of the sidelight to the first peak (step S204), so that $\Delta T_s$ is compared with $\Delta T_1$ in terms of magnitude (step S205).

If $\Delta T_s \leq \Delta T_1$, then the ASE is assumed to be not found. If $\Delta T_s > \Delta T_1$, on the other hand, the ASE does not arise because the voltage applied to the electrodes 2 is below a given value as shown in FIG. 8. Then, the controller 22 gives a command to the power source 3 to lower the voltage applied to the electrodes 2 by a given value (step S206).

Until the ASE is cut off, these steps S201 to S206 are then repeated.

(2) $F_2$ Concentration Control, and Total Pressure Control

In the aforesaid voltage control mode (1), the occurrence of the ASE is suppressed by control of the voltage applied to the electrodes 2. As described above, however, it is acceptable to control the concentration of $F_2$ in the laser gas or the pressure of the laser gas, thereby suppressing the occurrence of the ASE.

Figure 18:
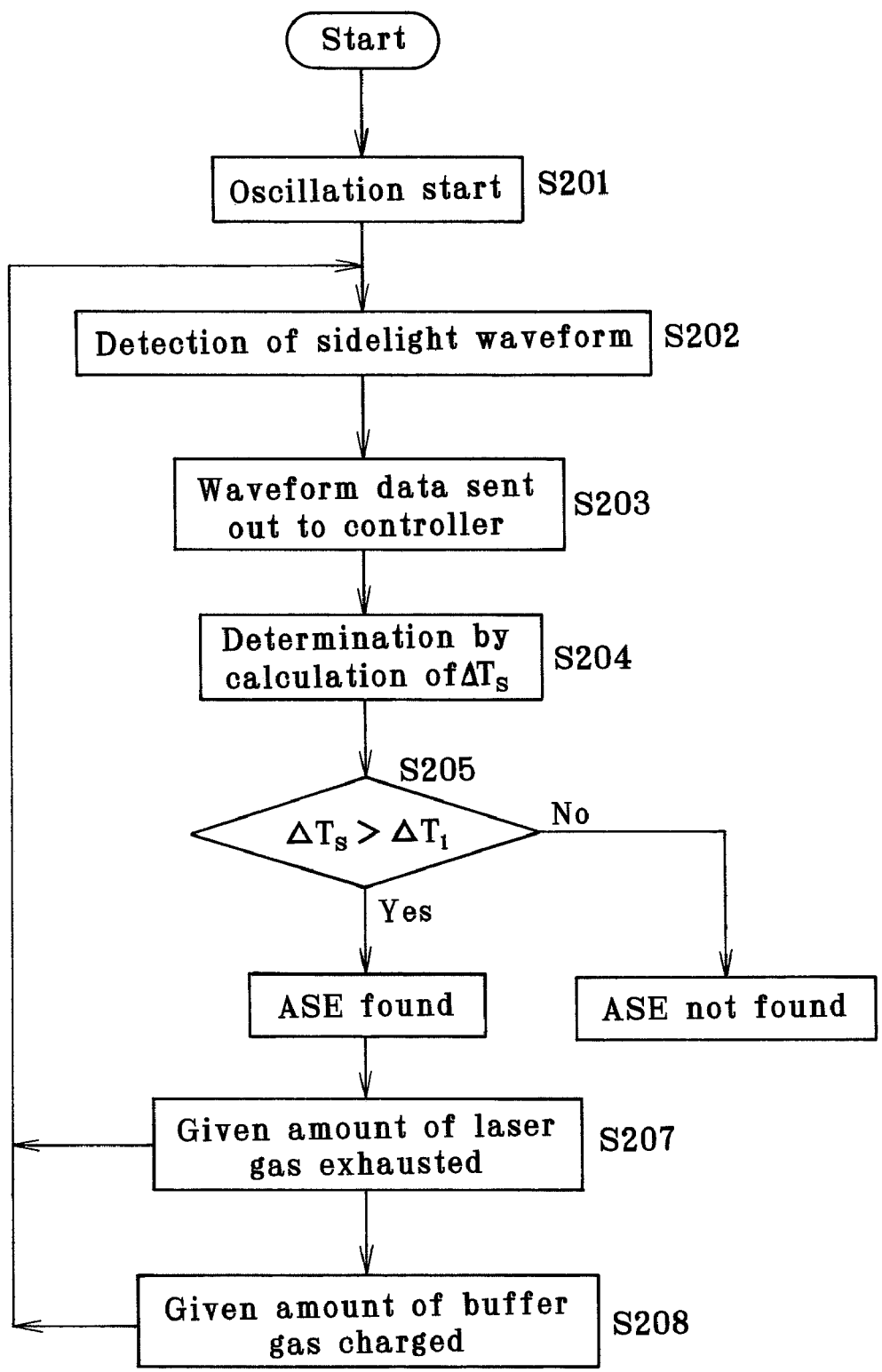
FIG. 18 is a flowchart of another embodiment of how the occurrence of the ASE is suppressed by control of $F_2$ concentration and total pressure.

In the $F_2$ concentration control mode, steps S201 to S205 of FIG. 18 (the same as steps S201 to S205 of FIG. 17) are implemented as in the voltage control mode. If A $T_s > \Delta T_1$ in step S205, the controller 22 opens the valve V3 while monitoring pressure data from the pressure gauge 25, thereby exhausting the laser gas from the laser chamber 1, and upon the laser gas pressure reaching a given pressure, the controller 22 closes the valve V3 (step S207).

Thereafter, the controller 22 opens the valve V1 while monitoring pressure data from the pressure gauge 25 (during which the valve V2 remains closed), thereby charging the buffer gas in the laser chamber 1. Upon the laser gas pressure reaching a given pressure, the controller 22 closes the valve V1 (step S208).

That is, a given amount of the laser gas is exhausted from the laser chamber and the same amount of the buffer gas is charged in the laser chamber, whereby the concentration of $F_2$ in the laser gas is decreased.

These steps S201 to S208 are then repeated until the ASE is cut off.

It is noted that to control the laser gas pressure thereby suppressing the occurrence of the ASE, the step S208 may be omitted from a series of steps S201 to S208.

In the aforesaid modes for control of the ASE, any one of the voltage applied to the electrodes 2, the concentration of $F_2$ in the laser gas in the laser chamber 1 and the pressure of the laser gas in the laser chamber 1 is used as the control parameter; however, it is noted that these parameters may be used alone or in combination of two or more for control purposes.

The ASE component can thus be cut off from the laser pulse by such control for the suppression of the ASE as mentioned above. The performance of the line-narrowing module 6 and the length of the laser resonator are appropriately determined or the laser pulse width is stretched so that the spectral linewidth and purity requirements needed for a dioptric type of aligner light sources can be satisfied.

Although depending on the performance of, for instance, the line-narrowing module 6, however, the desired spectral linewidth (of, e.g., 0.2 pm or less) is not always obtained by suppressing the occurrence of the ASE. For instance, at the applied voltage B of FIG. 8, the $F_2$ concentration E of FIG. 9, and the total laser gas pressure H of FIG. 10, the ASE does not occur, and the spectral linewidth is not lower than 0.2 pm, either.

A possible reason for this could be that with the performance of the line-narrowing module 6 used for observations of the properties depicted in FIG. 8, FIG. 9 and FIG. 10, the delay time Td (from the starting point of the rise of the sidelight to the starting point of the rise of the laser pulse) under the aforesaid conditions (applied voltage B, concentration E and total pressure H) is insufficient for allowing light to make sufficient round trips in the laser resonator, and so the laser pulse rises before the bandwidth of the light is fully narrowed.

How the spectral linewidth and purity are each controlled to a given value or below is now explained.

As already described, it is certain from the results of FIG. 6 that by the time light generated after the start of discharge (after the start of sidelight emission) is taken out of the laser resonator in the form of a laser beam (by the time the laser pulse rises), the light making round trips in the laser resonator has made several passes through the line-narrowing module 6 where the bandwidth has been narrowed to some extents.

On this presumption, at least one of the voltage applied to the electrode 2, the concentration of $F_2$ in the laser gas and the laser gas pressure is controlled to vary the delay time from the starting point of the rise of the sidelight to the starting point of the rise of the laser pulse, thereby obtaining a plurality of laser pulses with varying delay times. The then progression over time of the spectral linewidth is measured.

As can be seen from FIG. 6, the progressions over time of the aforesaid plurality of laser pulses (with the origin defined by the starting point of the rise of the sidelight) are found on the same curve under the same conditions for the performance of the line-narrowing module and the laser resonator.

Figure 19:
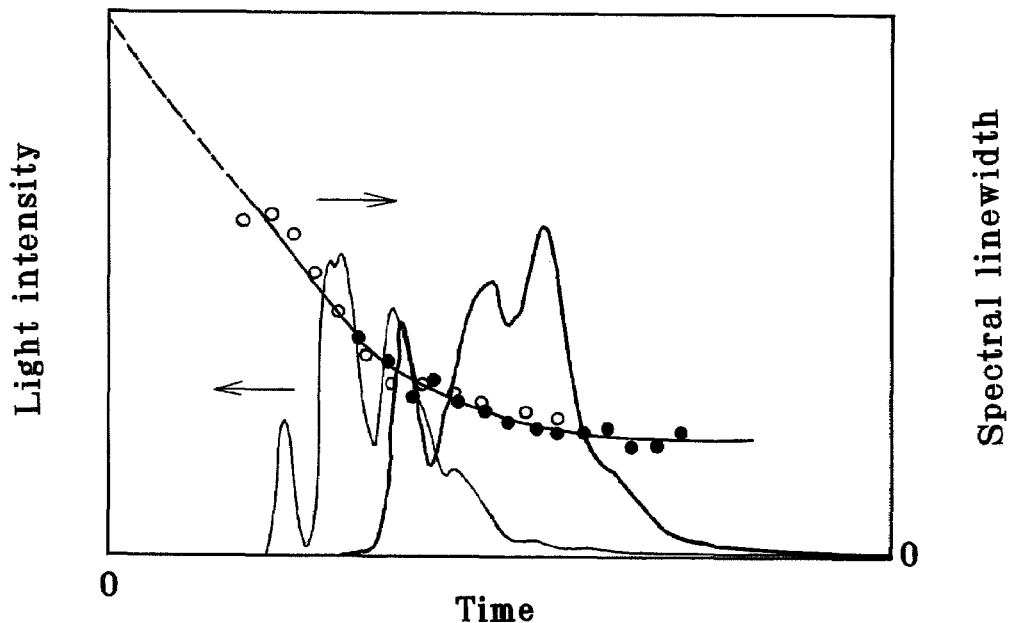
FIG. 19 is illustrative of the progression over time of the spectral linewidth with the origin defined by the starting point of the rise of the sidelight.

Thus, there are obtained the progression-over-time characteristics of the spectral linewidth with the origin defined by the starting point of the rise of the sidelight such as those shown in FIG. 19; that is, it is possible to estimate the progression-over-time characteristics of the spectral linewidth of light making round trips in the laser resonator before the rise of the laser pulse. The thus estimated progression-over-time characteristics of the spectral linewidth with the origin defined by the starting point of the rise of the sidelight are thought of as those determined from the performance of the line-narrowing module in the laser system used, the length of the laser resonator used, the stretched laser pulse width, etc.

From the progression-over-time characteristics of the spectral linewidth with the origin defined by the starting point of the rise of the sidelight such as those shown in FIG. 19, the sidelight waveform and the laser pulse waveform, whether the value of the spectral linewdith is a given value or lower is determined.

Figure 20:
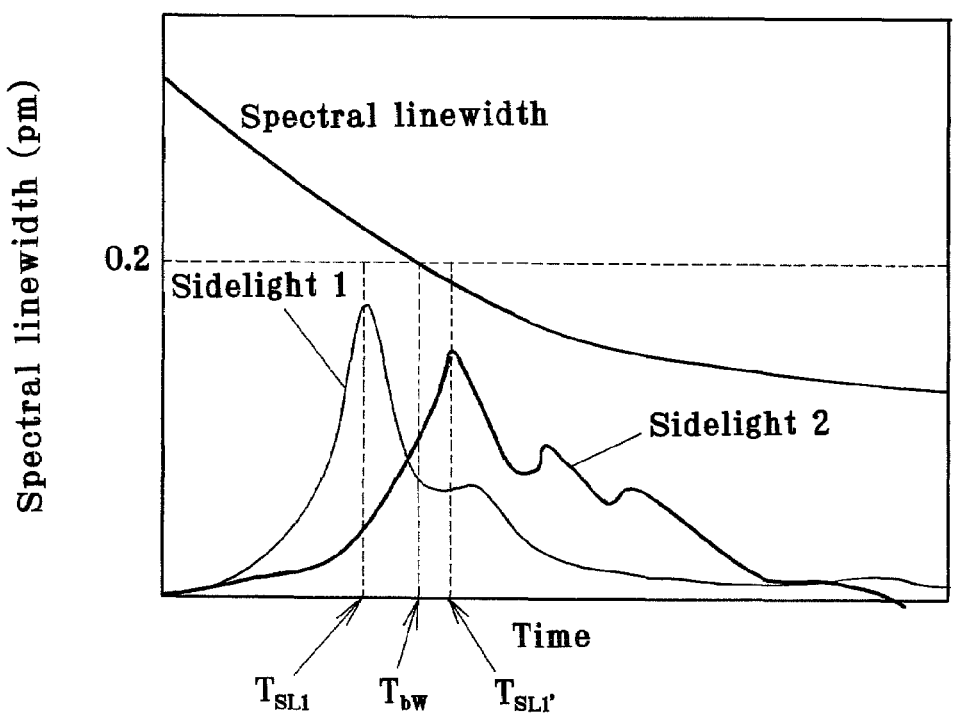
FIG. 20 is illustrative of the point of time the spectral linewidth becomes 0.2 pm in the progression over time of the spectral linewidth with the origin defined by the staring point of the rise of the sidelight.

From the previously found progression-over-time characteristics of the spectral linewidth with the origin defined by the starting point of the rise of the sidelight such as those shown in FIG. 19, the point of time $T_{bw}$ at which the spectral linewidth becomes 0.2 pm is found (FIG. 20). Generally, when the ASE does not occur, the starting point of the laser pulse waveform appears in the vicinity of the first peak point of time of the sidelight. Accordingly, if the point of time $T_{bw}$ is compared with the occurrence time $T_{SL1}$ of the first peak of the sidelight, it is then possible to determine whether or not the bandwidth of the light making round trips in the laser resonator prior to the appearance of the laser pulse has been narrowed to a given value (of, e.g., 0.2 pm or less).

That is, the point of time $T_{bw}$ at which the spectral linewidth becomes 0.2 pm is compared with the first peak time $T_{SL1}$ of the sidelight. If $T_{SL1} < T_{bw}$, then the bandwidth of the light making round trips in the laser resonator is not yet narrowed to 0.2 pm or lower before the appearance of the laser pulse, and if $T_{SL1} \geq T_{bw}$, then the bandwidth of the light making round trips in the laser resonator is already narrowed to 0.2 pm or lower before the appearance of the laser pulse.

Referring typically to FIG. 20, in the sidelight 1 where $T_{SL1} < T_{bw}$, the bandwidth of the light making round trips in the laser resonator is not yet narrowed to 0.2 pm or lower before the appearance of the laser pulse, and in the sidelight 2 where $T_{SL1'} \geq T_{bw}$, then the bandwidth of the light making round trips in the laser resonator is already narrowed to 0.2 pm or lower before the appearance of the laser pulse.

In this connection, according to the laser system build up of a line-narrowing module, a laser resonator having a given length and a laser pulse width designed and set in such a way as to achieve the spectral linewidth of 0.2 pm or lower and used in the experimentation by the present inventors, the ASE did not occur when laser pulses appeared after the point of time $T_{bw}$ from the starting point of the sidelight.

On the basis of the aforesaid finding, the following control was implemented to narrow the bandwidth of the light making round trips in the laser resonator to 0.2 pm or lower before the appearance of the laser pulse, thereby obtaining a laser beam having a spectral linewidth of 0.2 pm or lower.

(1) Voltage Control

Figure 21:
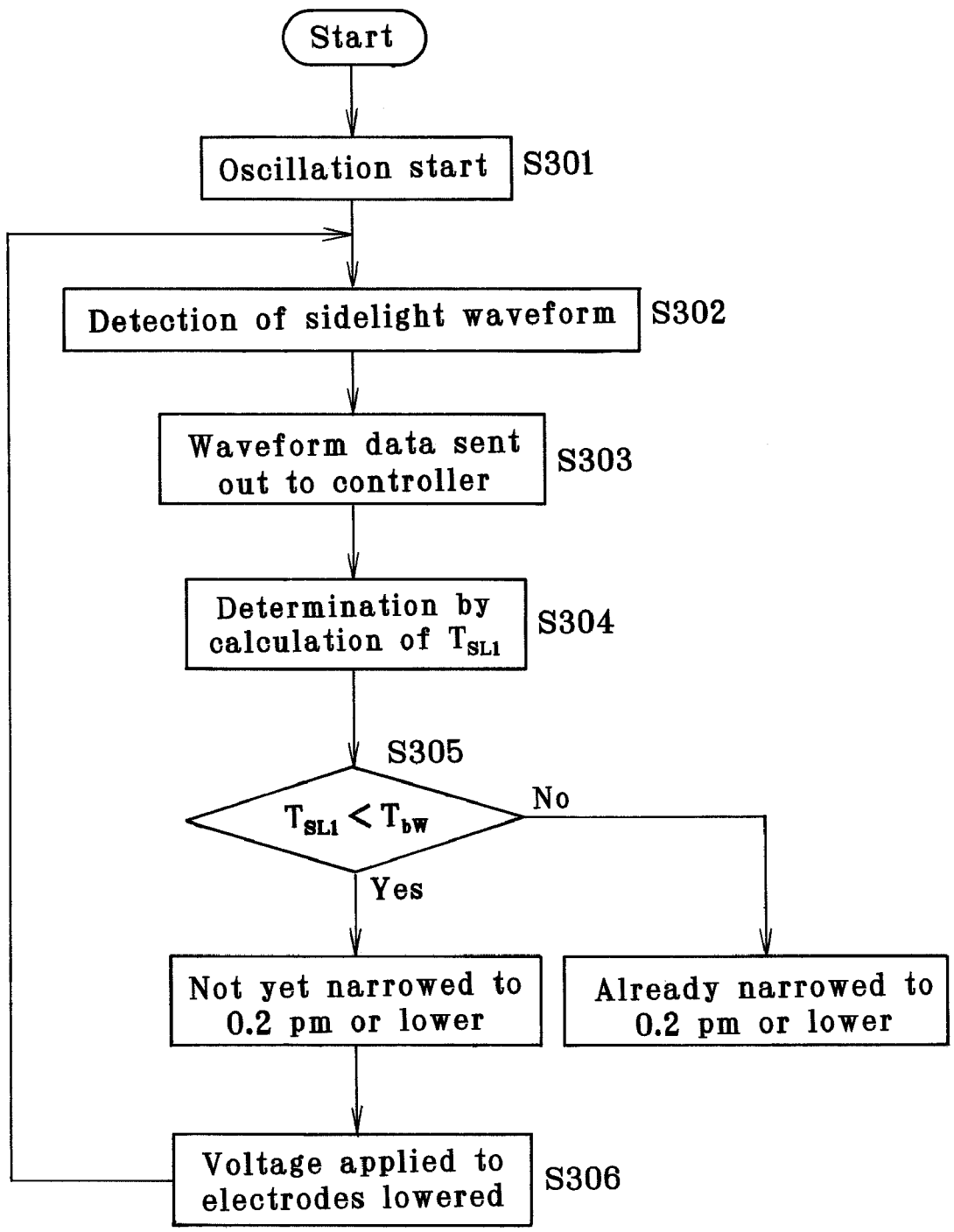
FIG. 21 is a flowchart of one embodiment of how the spectral linewidth is controlled to 0.2 pm or less by voltage control.

FIG. 21 is a flowchart illustrative of how the spectral linewidth is controlled to 0.2 pm or lower by means of voltage control.

According to the aforesaid method, the progression over time of the spectral linewidth with the origin defined by the starting point of the sidelight is found to determine the point of time $T_{bw}$ at which the spectral linewidth takes on a given value (of, e.g., 0.2 pm). The controller 22 stores the aforesaid point of time $T_{bw}$ ahead.

Then, the controller 22 gives a command to the power source 3 to generate laser discharge, thereby initiating laser oscillation (step S301).

Then, the pulse waveform over time of the sidelight is detected by the sidelight detector 24 (step S302), and the ensuing detection data are sent out to the controller 22 (step S303).

From the received wave data, the controller 22 determines by calculation the first peak time $T_{SL1}$ of the sidelight with the origin defined by the starting point of the sidelight (step S304), so that $T_{SL1}$ is compared with $T_{bw}$ in terms of magnitude (step S305)

If $T_{SL1} \geq T_{bw}$, then the bandwidth of the light making round trips in the laser resonator is assumed to have already been narrowed to 0.2 pm or lower before the appearance of the laser pulse. If $T_{SL1} < T_{bw}$, on the other hand, the controller 22 gives a command to the power source 3 to lower the voltage applied to the electrodes 2 by a given value (step S306).

The steps S301 to S306 are then repeated until $T_{SL1} \geq T_{bw}$.

(2) $F_2$ Concentration Control, and Total Pressure Control

While, in the aforesaid voltage control mode (1), the voltage applied to the electrodes 2 is controlled to allow the light making round trips in the laser resonator to take on a given value (of 0.2 pm or lower) before the rise of the laser pulse, it is acceptable to control the concentration of $F_2$ in the laser gas or the pressure of the laser gas for the same purpose.

Figure 22:
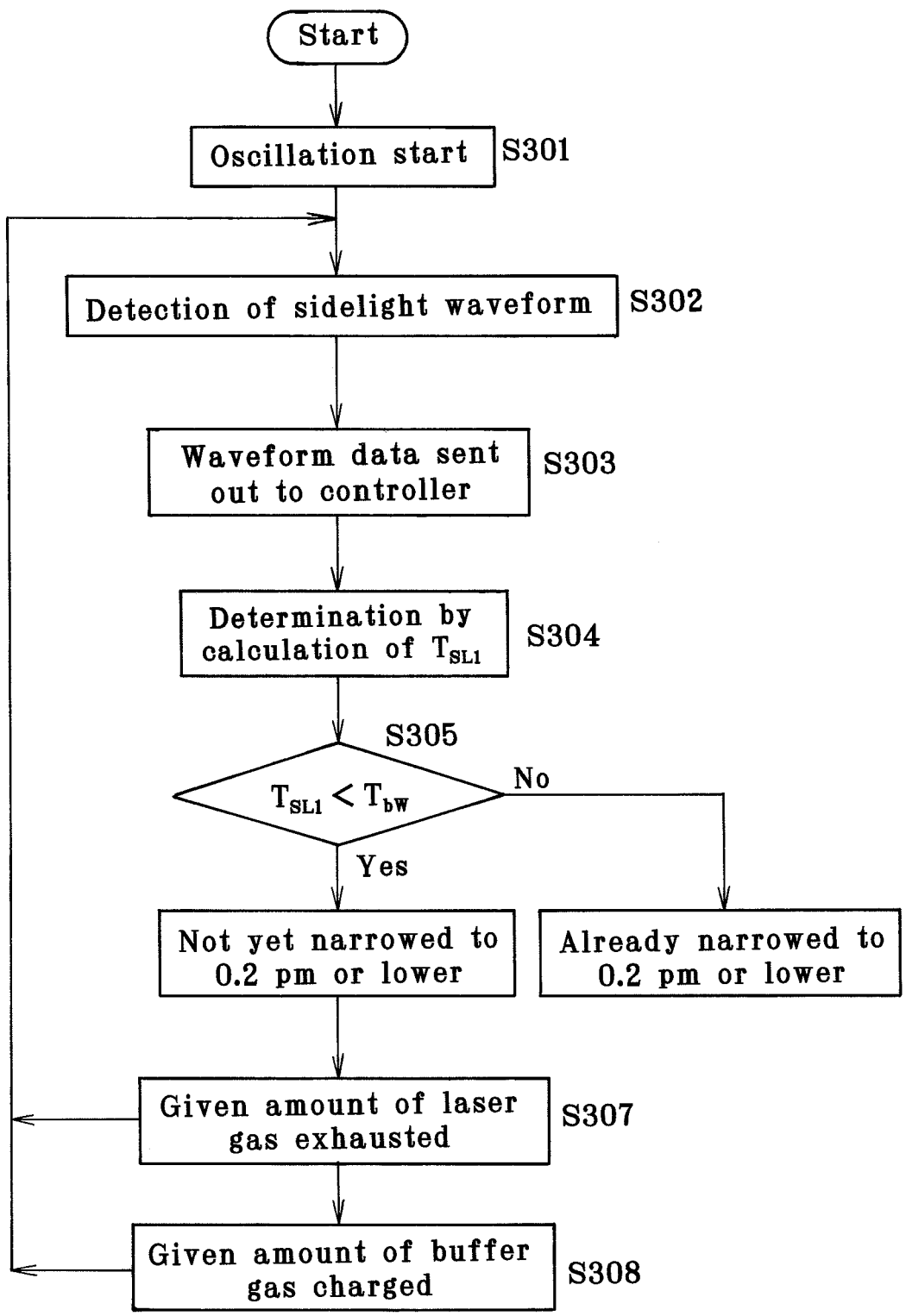
FIG. 22 is a flowchart of one embodiment of how the spectral linewidth is controlled to 0.2 pm or less by control of $F_2$ concentration, and total pressure.

For control of the concentration of $F_2$, steps S301 to S305 of FIG. 22 (the same as steps S301 to S305 of FIG. 21) are implemented as is the case with voltage control. If $T_{SL1} < T_{bw}$ in step S305, the controller 22 opens the valve V3 while monitoring the pressure data from the pressure gauge 25 to exhaust the laser gas from the laser chamber 1. Upon the laser gas pressure reaching a given pressure, the controller 22 closes the valve V3 (step S307).

Thereafter, the controller 22 opens the valve V1 while monitoring the pressure data from the pressure gauge 25 (during which the valve V2 remains closed) to charge the buffer gas in the laser chamber 1. Upon the laser gas pressure reaching a given pressure, the controller 22 closes the valve V1 (step S308).

Thus, a given amount of the laser gas is exhausted from the laser chamber and the same amount of the buffer gas is charged in the laser chamber to decrease the concentration of $F_2$ in the laser gas.

The steps S301 to S308 are then repeated until $T_{SL1} \geq T_{bw}$.

It is noted that to control the pressure of the laser gas thereby allowing the light making round trips in the laser resonator to attain a given value (of 0.2 pm or lower) before the rise of the laser pulse, the step S308 may be omitted from a series of steps S301 to S308.

Figure 23:
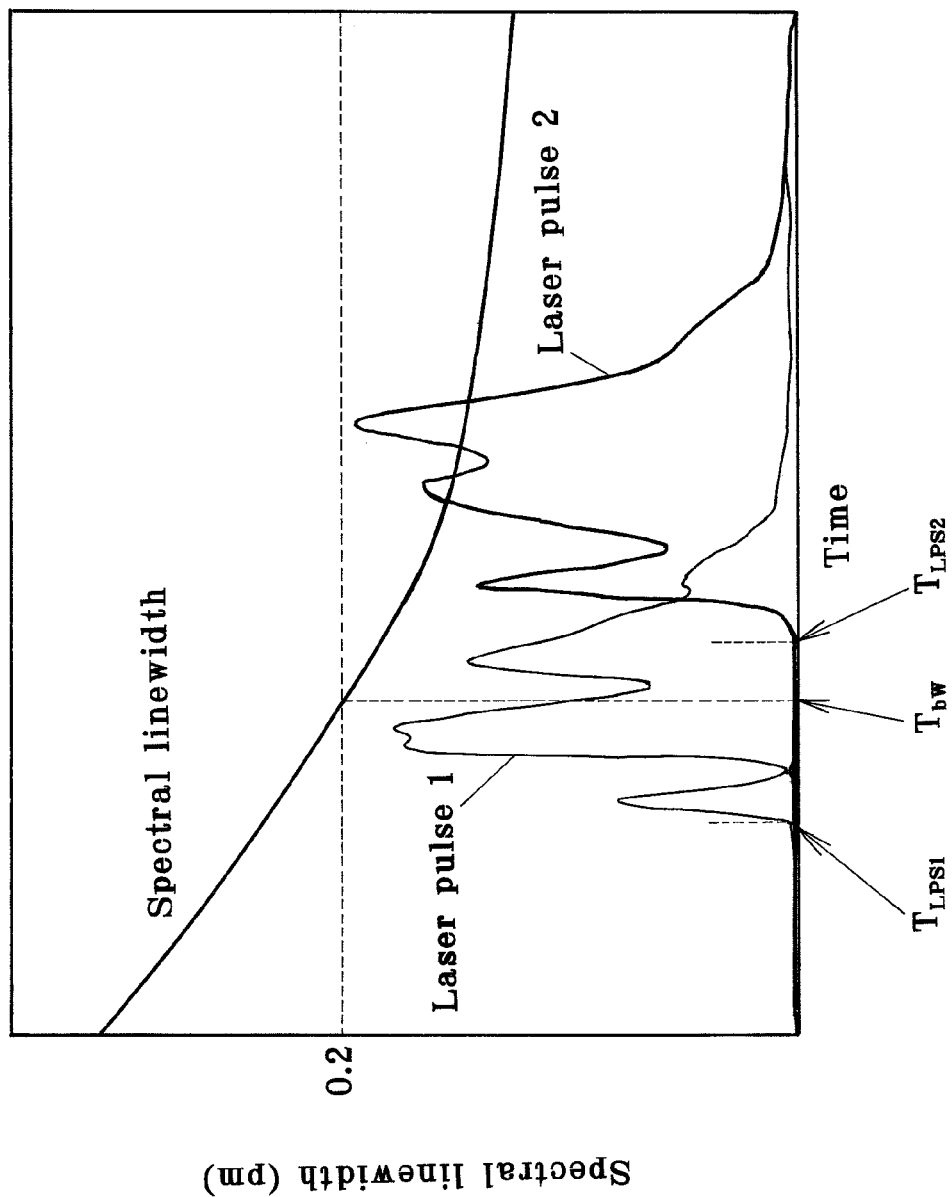
FIG. 23 is illustrative of what relations the starting point $T_{LPS}$ of the rise of the laser pulse and the point of time $T_{bw}$ the spectral linewidth becomes 0.2 pm have to the laser pulse waveform.

It is thus found that whether or not the light making round trips in the laser resonator attains a given value (of 0.2 pm or lower) before the rise of the laser pulse can be determined through the results of comparison of the first peak time $T_{SL}$ of the sidelight with the point of time $T_{bw}$ the spectral linewidth becomes 0.2 pm, as found from the previously obtained progression-over-time characteristics of the spectral linewidth with the origin defined by the starting point of the rise of the sidelight. As shown in FIG. 23, however, it is acceptable to use the results of comparison of the point of time $T_{bw}$ with the starting point $T_{LPS}$ of the rise of the laser pulse for the same determination.

To this end, the point of time $T_{bw}$ the spectral linewidth becomes 0.2 pm is compared with the starting point $T_{LPS}$ of the rise of the laser pulse. If $T_{LPS} \leq T_{bw}$, the bandwidth of the light making round trips in the laser resonator is not yet narrowed to 0.2 pm or lower before the appearance of the laser pulse, and if $T_{LPS} > T_{bw}$, the bandwidth of the light making round trips in the laser resonator is already narrowed to 0.2 pm or lower before the appearance of the laser pulse.

In FIG. 23, in the laser pulse 1 where $T_{LPS1} < T_{bw}$, the bandwidth of the light making round trips in the laser resonator is not yet narrowed to 0.2 pm or lower before the appearance of the laser pulse, and in the laser pulse 2 where $T_{LPS2} > T_{bw}$, the bandwidth of the light making round trips in the laser resonator is already narrowed to 0.2 pm or lower before the appearance of the laser pulse.

As described above, the starting point $T_{LPS}$ of the laser pulse waveform is here defined as the point of time before the appearance of the first peak of the laser pulse waveform and 5% of the first peak intensity are attained. It is understood, however, that the starting point $T_{LPS}$ of the laser pulse waveform may be defined as any point of time before the appearance of the first peak of the laser pulse waveform and less than 5% of the first peak intensity are attained.

In this connection, according to the laser system build up of a line-narrowing module, a laser resonator having a given length and a laser pulse width designed and set in such a way as to achieve the spectral linewidth of 0.2 pm or lower and used in the experimentation by the present inventors, the ASE did not occur when laser pulses appeared after the point of time $T_{bw}$ from the starting point of the sidelight.

On the basis of the aforesaid finding, the following control was implemented to narrow the bandwidth of the light making round trips in the laser resonator to 0.2 pm or lower before the appearance of the laser pulse, thereby obtaining a laser beam having a spectral linewidth of 0.2 pm or lower.

(1) Voltage Control

Figure 24:
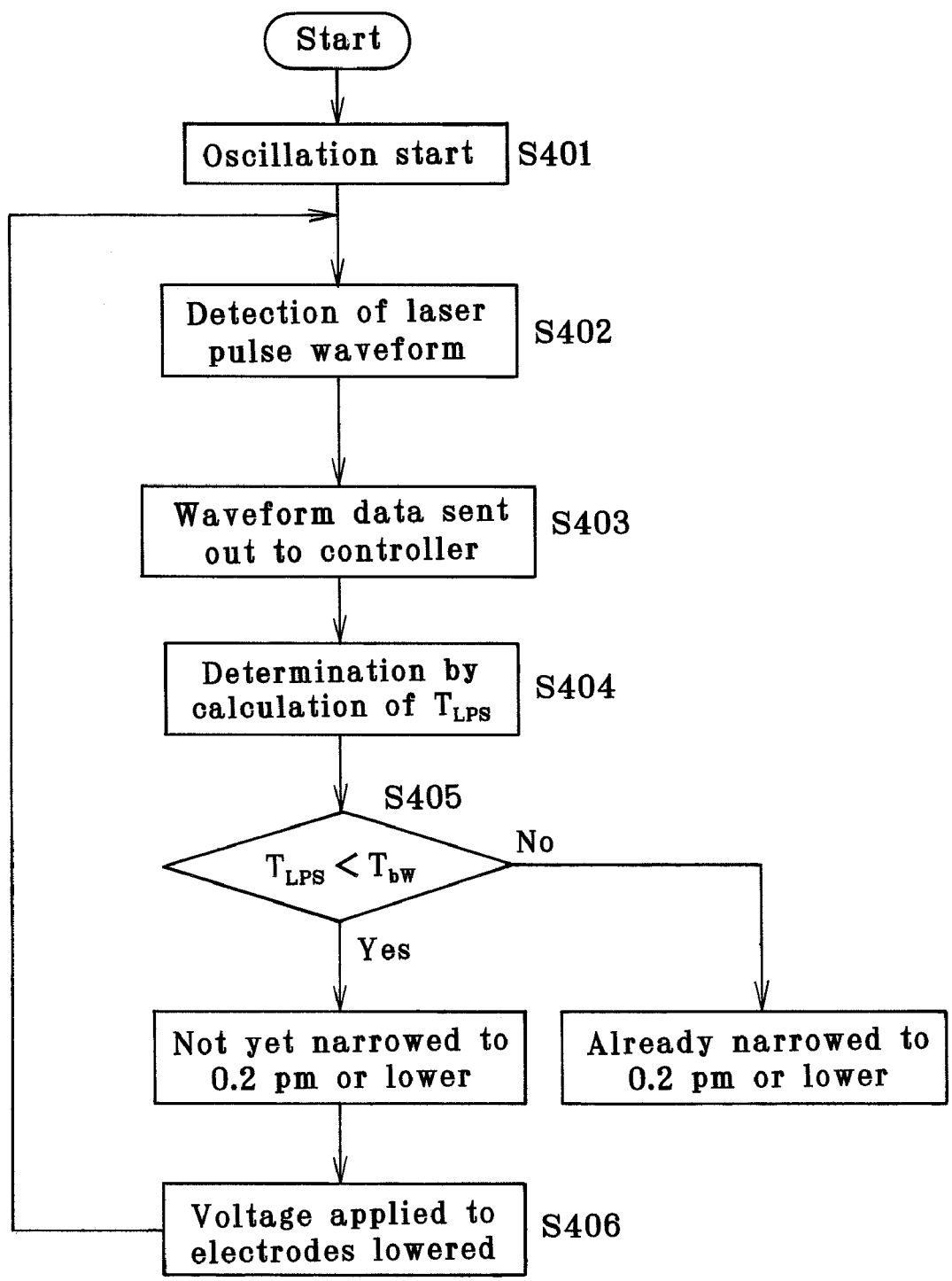
FIG. 24 is a flowchart of another embodiment of how the spectral linewidth is controlled to 0.2 pm or less by voltage control.

FIG. 24 is a flowchart illustrative of how the spectral linewidth is controlled to 0.2 pm or lower by means of voltage control.

According to the aforesaid method, the progression over time of the spectral linewidth with the origin defined by the starting point of the sidelight is found to determine the point of time $T_{bw}$ at which the spectral linewidth takes on a given value (of, e.g., 0.2 pm). The controller 22 stores the aforesaid point of time $T_{bw}$ ahead.

Then, the controller 22 gives a command to the power source 3 to generate laser discharge, thereby initiating laser oscillation (step S401).

Then, the pulse waveform over time of the laser pulse is detected by the sidelight detector 21 (step S402), and the ensuing detection data are sent out to the controller 22 (step S403).

From the received wave data, the controller 22 determines by calculation the starting point $T_{LPS}$ of the laser pulse with the origin defined by the starting point of the laser pulse (step S404), so that $T_{LPS}$ is compared with $T_{bw}$ in terms of magnitude (step S405)

If $T_{LPS} \geq T_{bw}$, then the bandwidth of the light making round trips in the laser resonator is assumed to have already been narrowed to 0.2 pm or lower before the appearance of the laser pulse. If $T_{LPS} < T_{bw}$, on the other hand, the controller 22 gives a command to the power source 3 to lower the voltage applied to the electrodes 2 by a given value (step S406).

The steps S401 to S406 are then repeated until $T_{LPS} \geq T_{bw}$.

(2) $F_2$ Concentration Control, and Total Pressure Control

While, in the aforesaid voltage control mode (1), the voltage applied to the electrodes 2 is controlled to allow the light making round trips in the laser resonator to take on a given value (of 0.2 pm or lower) before the rise of the laser pulse, it is acceptable to control the concentration of $F_2$ in the laser gas or the pressure of the laser gas for the same purpose.

Figure 25:
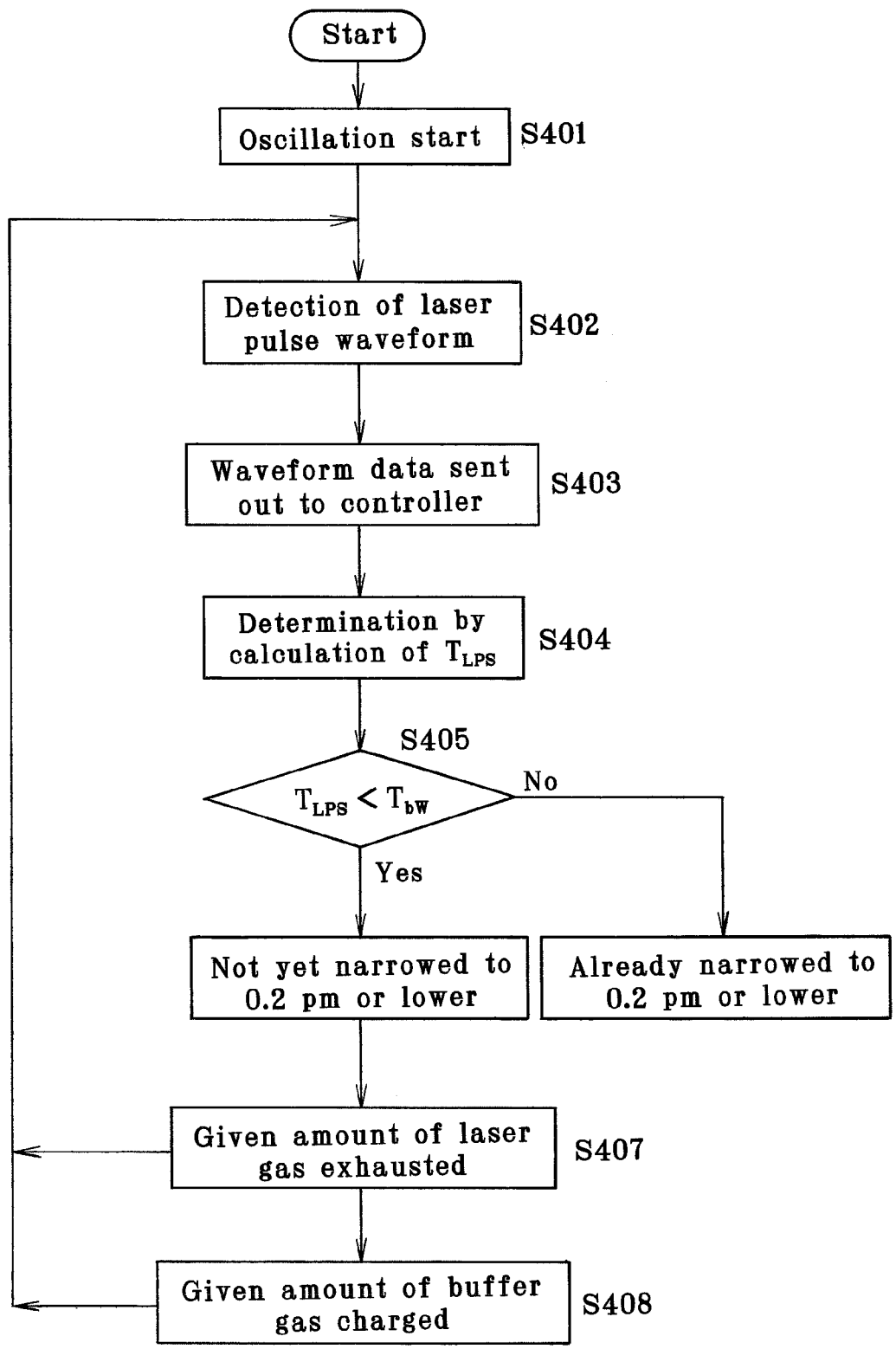
FIG. 25 is a flowchart of another embodiment of how the spectral linewidth is controlled to 0.2 pm or less by control of $F_2$ concentration, and total pressure.

For control of the concentration of $F_2$, steps S401 to S405 of FIG. 25 (the same as steps S401 to S405 of FIG. 24) are implemented as is the case with voltage control. If $T_{LPS} < T_{bw}$ in step S405, the controller 22 opens the valve V3 while monitoring the pressure data from the pressure gauge 25 to exhaust the laser gas from the laser chamber 1. Upon the laser gas pressure reaching a given pressure, the controller 22 closes the valve V3 (step S407).

Thereafter, the controller 22 opens the valve V1 while monitoring the pressure data from the pressure gauge 25 (during which the valve V2 remains closed) to charge the buffer gas in the laser chamber 1. Upon the laser gas pressure reaching a given pressure, the controller 22 closes the valve V1 (step S408).

Thus, a given amount of the laser gas is exhausted from the laser chamber and the same amount of the buffer gas is charged in the laser chamber to decrease the concentration of $F_2$ in the laser gas.

The steps S401 to S408 are then repeated until $T_{LPS} \geq T_{bw}$.

It is noted that to control the pressure of the laser gas thereby allowing the light making round trips in the laser resonator to attain a given value (of 0.2 pm or lower) before the rise of the laser pulse, the step S408 may be omitted from a series of steps S401 to S408.

In the aforesaid embodiment of the invention, the progression over time of the spectral linewidth depending on the line-narrowing module, the length of the laser resonator, etc. in the laser system used is previously found with the origin defined by the starting point of the sidelight, thereby finding the point of time $T_{bw}$ the light making round trips in the laser resonator attains a given spectral linewidth. Then, the $T_{bw}$ is compared with the detected first peak time $T_{SL}$ of the sidelight or the detected time $T_{LPS}$ of the rise of the laser pulse. On the basis of the obtained results, the light making round trips in the laser resonator is allowed to attain a given spectral linewidth before the rise of the laser pulse.

In the aforesaid embodiment, any one of the voltage applied to the electrodes 2, the concentration of $F_2$ gas in the laser gas in the laser chamber 1 and the pressure of the laser gas in the laser chamber 1 is used as the control parameter. It is understood, however, that these parameters may be used alone or in combination of two or more.

In the aforesaid embodiment, the progression over time with the origin defined by the starting point of the sidelight is previously found, and with this progression, control is implemented in such a way that the light making round trips in the laser resonator attains a given spectral linewidth before the rise of the laser pulse. It is understood, however, that it is acceptable to previously find the progression over time of the spectral purity with the origin defined by the starting point of the sidelight, thereby controlling the light making round trips in the laser resonator in such a way as to attain a given spectral purity before the rise of the laser pulse according to the same steps as mentioned above.

It is also acceptable to previously find the progressions over time of the spectral linewidth and spectral purity with the origin defined by the starting point of the sidelight, thereby controlling the light making round trips in the laser resonator in such a way as to attain a given spectral linewidth and a given spectral purity according to the same steps as mentioned above.

In the aforesaid control mode of spectral linewidth and spectral purity, when the line-narrowing module designed by the inventors to achieve an ultra-narrow spectral linewidth of 0.2 pm or lower or currently available line-narrowing modules were used, the ASE did not occur after the aforesaid point of time.

If it is intended to suppress the occurrence of the ASE or take control of spectral linewidth and spectral purity with reliability, it is then preferable to use the aforesaid ASE control (FIGS. 14, 15, 17 and 18), spectral linewidth control and spectral purity control (FIGS. 21, 22, 24 and 25) in appropriate combinations.

Figure 26:
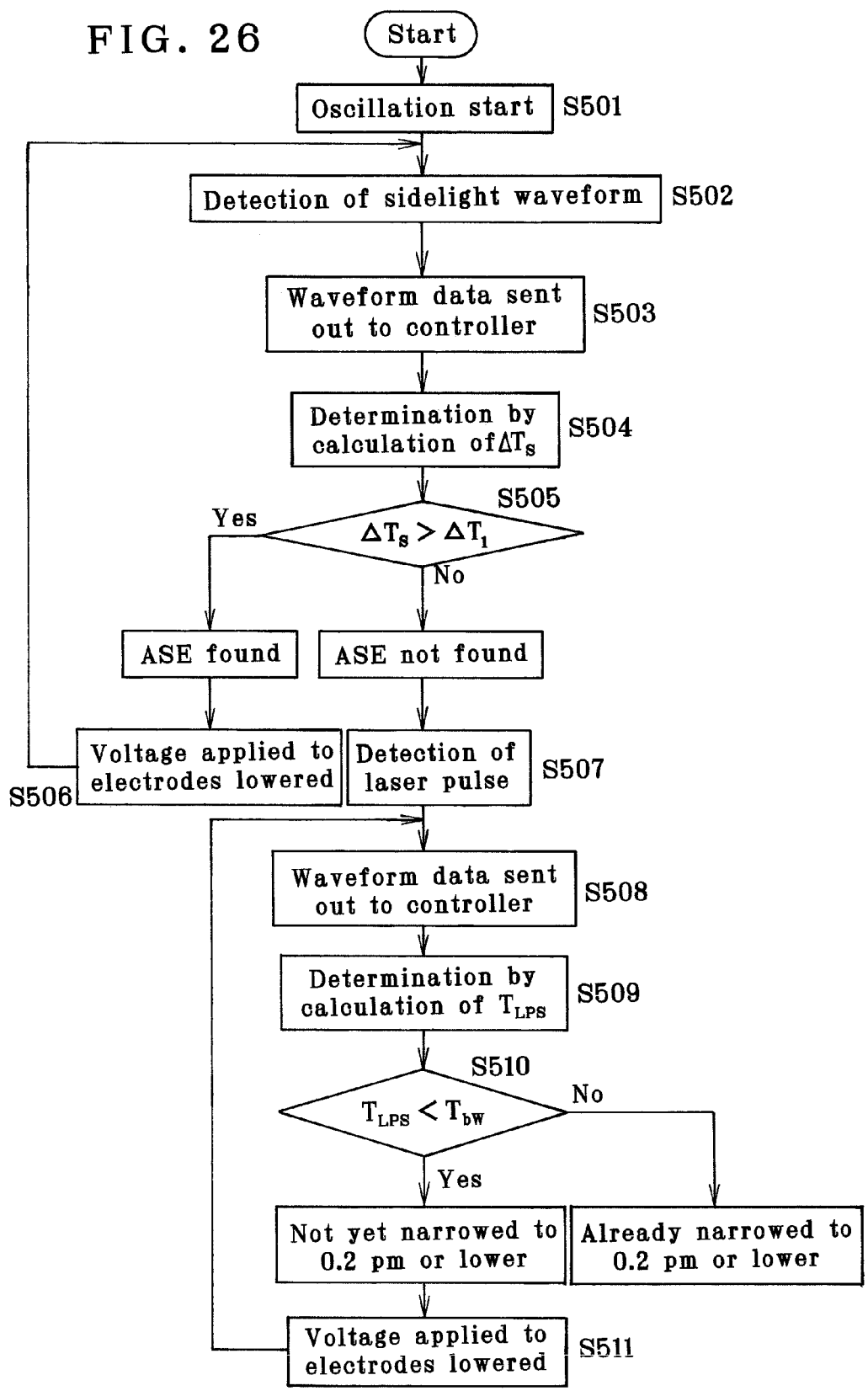
FIG. 26 is a flowchart of one embodiment wherein the maximum gradient $\Delta T_s$ of the rising edge of the sidelight is determined to suppress the ASE and the starting point $T_{LPS}$ of the rise of the laser pulse is determined to control the spectral linewidth.

Some preferred combinations are now described. As an example, the maximum gradient $\Delta T_s$ of the rising edge of the sidelight is found for ASE control (FIG. 17) while the starting point $T_{LPS}$ of the rise of the laser pulse is found for control of spectral linewidth (FIG. 24). FIG. 26 is a flowchart of how this control is implemented.

As already described, it is found that the ASE occurs when the maximum gradient $\Delta T_s$ and given value $\Delta T_1$ of the rising edge of the sidelight are exceeded. This given value $\Delta T_1$ is dependent on the performance of the line-narrowing module 6 (such as the expanding factor of the expanding prism 7 and the blaze angle of the diffraction grating 8) and the length of the laser resonator. The controller 22 stores ahead the given value $\Delta T_1$ obtained according to the dependent conditions of the laser system.

The progression over time of the spectral linewidth with the origin defined by the starting point of the sidelight is determined according to such a method as described hereinbefore to determine the point of time $T_{bw}$ the spectral linewidth attains a given value (of, e.g., 0.2 pm). The controller 22 stores the point of time $T_{bw}$ ahead.

First, the controller 22 gives a command to the power source 3 to generate laser discharge for the start of laser oscillation (step S501).

Then, the pulse waveform over time of the sidelight is detected by the sidelight detector 24 (step S502), and the ensuing detection data are sent out to the controller 22 (step S503).

Then, the controller 22 receives waveform data to determine by calculation the maximum gradient $\Delta T_s$ of the rising edge of the sidelight from the range from the starting point of the sidelight to the first peak (step S504), so that $\Delta T_s$ is compared with $\Delta T_1$ in terms of magnitude (step S505).

If $\Delta T_s \leq \Delta T_{bw}$, the ASE is assumed to be not found. If $\Delta T_s > \Delta T_1$, on the other hand, the controller 22 gives a command to the power source 3 to lower the voltage applied to the electrodes 2 by a given value (step S506) because, as shown in FIG. 8, the ASE does not occur when the voltage applied to the electrodes 2 is below a given value.

Steps S501 to S506 are then repeated until the ASE is cut off.

Upon identification of the absence of the ASE, the pulse waveform over time of the laser pulse is detected by the laser pulse detector 21 (step S507), and the ensuing detection data are sent out to the controller 22 (step S508).

The controller 22 receives waveform data to determine by calculation the starting point $T_{LPS}$ of the rise of the laser pulse with the origin defined by the starting point of the laser pulse (step S509), so that $T_{LPS}$ is compared with $T_{bw}$ in terms of magnitude (step S510).

If $T_{LPS} \geq T_{bw}$, the bandwidth of the light making round trips in the laser resonator is assumed to have been narrowed to 0.2 pm or lower before the appearance of the laser pulse. If $T_{LPS} < T_{bw}$, on the other hand, the controller 22 gives a command to the power source 3 to lower the voltage applied to the electrodes 2 by a given value (step S511).

Steps S508 to S511 are then repeated until $T_{LPS} \geq Tb_{bw}$.

In the aforesaid embodiment, the spectral linewidth is controlled after the ASE has been cut off. However, the present invention is not necessarily limited to this embodiment; for instance, it is acceptable to cut off the ASE after the spectral linewidth has been controlled.

For control of the ASE, whether or not the ASE occurs is determined with the maximum gradient of the rising edge of the sidelight. However, the present invention is not necessarily limited to this; as already described, for instance, it is acceptable to determine whether or not the ASE occurs using the first peak time $T_{SL1}$ of the sidelight and the first peak time $T_{LP1}$ of the laser pulse (FIGS. 14 and 15) or the starting point $T_{LPS}$ of the laser pulse.

In the aforesaid embodiment, the starting point $T_{LPS}$ of the rise time of the laser pulse is detected for control of spectral linewidth. The present invention is not necessarily limited to this; as already described, for instance, it is acceptable to detect the first peak time $T_{SL1}$ of the sidelight for the same control (FIGS. 21 and 22).

In the aforesaid embodiment, both the ASE and the spectral linewidth are controlled. However, the present invention is not necessarily limited to this; for instance, it is acceptable to control the spectral purity instead of the spectral linewidth or take control of both the spectral linewidth and the spectral purity.

While several embodiments have been explained specifically with reference to the $F_2$ laser system to which the present invention is applied, it is understood that the present invention is applicable to KrF laser systems and ArF laser systems as well. For instance, it is possible to narrow the spectral linewidth to at least the value that aligners require KrF or ArF laser systems to have.

Regarding the construction of the laser system of FIG. 11 (FIG. 1), it is noted that the line-narrowing module 6 is made up of the (diffraction) grating 8 and the expanding prism 7 for the achievement of narrowed spectral linewidths. In addition to such a grating prism mode, an etalon mode may be applied to the line-narrowing module 6. In the etalon mode, it is possible to vary the center wavelength of oscillation by rotation of etalon or a change of gas pressure in an etalon gap (a refractive index change of gas).

By the way, the average output needed for an $F_2$ laser system as a semiconductor aligner light source, for instance, is 20 W. To be specific, when the $F_2$ laser system has a repetitive frequency of 2 kHz, pulse energy per pulse is 10 mJ, and at a repetitive frequency of 4 kHz, pulse energy per pulse is 5 mJ.

As the energy injected into the laser gas by way of discharge between the electrodes increases, line-narrowing becomes difficult at a pulse energy of 5 to 10 mJ because the rise of the laser pulse is premature and the ASE develops as well.

Situations being like this, to obtain a laser beam having a spectral linewidth of 0.2 pm or lower and a pulse energy of at least 5 mJ, for instance, it is preferable to make use of a two-stage laser system constructed of an oscillation-stage laser and an amplification-stage laser. With this laser system, a laser beam having a spectral linewidth of 0.2 pm or lower can be generated at low output from the oscillation-stage laser, so that the laser beam can be amplified through the amplification-stage laser to obtain a laser beam having a spectral linewidth of 0.2 pm or lower yet a pulse energy of at least 5 mJ.

Typical arrangements for the two-stage laser system include an injection locking arrangement and an MOPA (master oscillator power amplifier) arrangement. The former has a laser resonator in the amplification-stage laser whereas the latter has no laser resonator in the amplification-stage laser.

A typical arrangement for the two-state laser system is here explained with reference to the injection locking arrangement shown in FIG. 27. As described just above, the injection locking system uses an oscillation-stage laser 30 and an amplification-stage laser 40. The oscillation-stage (oscillator) laser 30 functions as a seed laser (seed laser light), and the amplification-stage laser (amplifier) 40 has a function of amplifying the seed laser.

Thus, the overall spectral properties of the laser system are determined by the spectral properties of the oscillation-stage laser 30, and the laser output (energy or power) from the laser system is governed by the amplification-stage laser 40.

Figure 27:
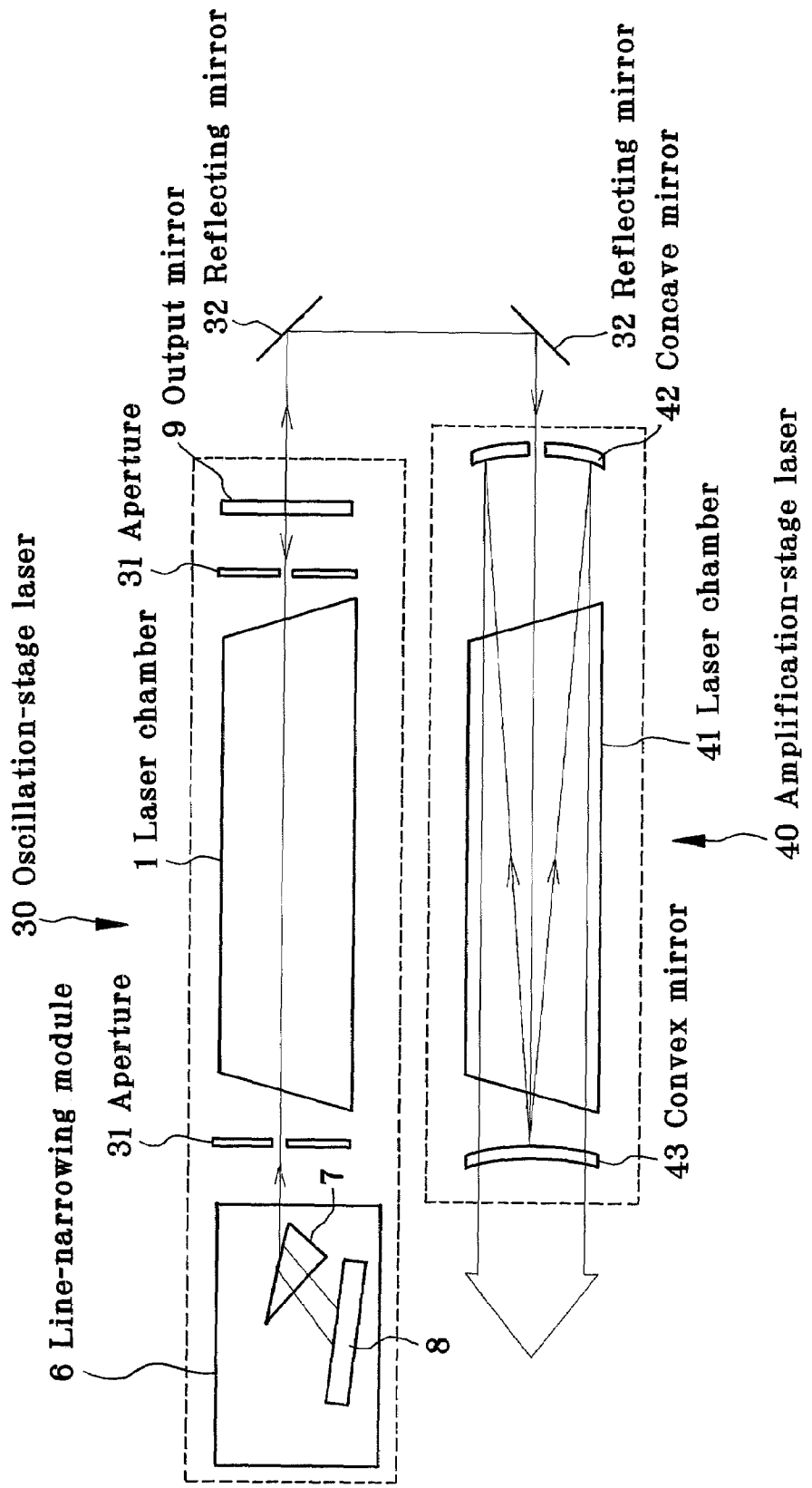
FIG. 27 is illustrative of one exemplary construction of an injection lock type line-narrowed $F_2$ laser system to which the control method of the invention is applied.

Accordingly, the oscillation-stage laser 30 includes a line-narrowing module 6 built up of a (diffraction) grating 8 and an expanding prism 7 as shown typically in FIG. 27, so that a laser with a narrowed spectral linewidth is generated from the oscillation-stage laser 30. In FIG. 27, it is noted that resonators on both sides of a laser chamber 1 in the oscillation-stage laser 30 are provided therein with apertures 31 for limiting a laser beam in the oscillation-stage laser 30.

A laser beam (seed laser beam) from the oscillation-stage laser 30 is guided and injected through a beam propagation system including a reflecting mirror 32, etc. into the amplification-stage laser 40. For the amplification-stage laser 40 in the injection locking arrangement, an unstable type resonator composed of a concave mirror 42 and a convex mirror 43 and having a magnification of, e.g., 3 or more is used.

The concave mirror 42 in the unstable type resonator in the amplification-stage laser 40 is provided therein with an opening through which the seed laser beam is introduced into the amplification-stage laser 40. Then, the seed laser beam is reflected and expanded at the convex mirror 43 as indicated by an arrow, passing effectively through a discharge portion in the laser chamber 41 and increasing in power. The laser beam then leaves the convex mirror 43. A central portion of the concave mirror 42 is provided with a spatial opening while a peripheral portion thereof is provided with a high-reflectivity mirror coat, and a central portion of the convex mirror 43 is provided with a high-reflectivity mirror coat where a peripheral laser-emerging portion thereof is provided with an antireflection coat. Instead of the concave mirror 42 having a spatial opening, it is acceptable to use a mirror substrate having an opening only to which an antireflection coat is applied or, alternatively, an unstable resonator having a mirror with no transmitting portion.

When the concave mirror 42 and convex mirror 43 are not used in the amplification-stage laser 40, the present system provides an MOPA system. Because of the absence of the resonating mirrors (concave mirror 42 and convex mirror 43) in the amplification-stage laser 40, the amplification-stage mirror 40 functions as a one-pass amplifier for the oscillation-stage laser 30.

In the two-stage laser system such as an injection locking system or an MOPA system, the properties of a laser beam emitted out of the amplification-stage laser are affected by the oscillation-stage laser light injected on the rise of the amplification-stage laser light. More exactly, in the laser pulse from the oscillation-stage laser injected in the laser gas in the amplification-stage laser, the instantaneous spectra of the oscillation-stage laser pulse on the rise of the amplification-stage laser light have direct influences on the spectral linewidth properties of the two-stage laser.

The line-narrowed $F_2$ laser system according to the present invention as described above, for instance, is applied to the two-stage laser system of FIG. 27 as will be explained just below. Here assume that the oscillation-stage laser 30 is used as the laser system of the invention. First, the starting point $T_{LPS}$ of the rise of the laser pulse from the oscillation-stage laser 30 is detected. Then, the sidelight of the amplification-stage laser 40 is allowed to rise after the starting point of the rise (i.e., start discharge). By doing so, the instantaneous spectrum of the oscillation-stage laser pulse is narrowed to 0.2 pm or lower on the rise of the amplification-stage laser light. Then, this has influences on the spectral linewidth properties of the two-stage laser, resulting in the achievement of a high-output, line-narrowed laser system.

While the line-narrowed gas laser system of the invention has been explained with reference to its principles and embodiments, it is understood that the present invention is in no sense limited thereto and so many modifications may be possible within the scope of the invention.

According to the present invention as explained above at great length, the rise of the sidelight is made so gentle that the starting point of a laser pulse can exist after the point of time of the first peak of the sidelight, thereby cutting off the ASE. It is thus possible to achieve a line-narrowed $F_2$ gas laser system having a spectral linewidth of 0.2 pm or lower and a spectral purity of 0.5 pm or lower. It is also possible to achieve a KrF laser system and an ArF laser system having improved line-narrowing capability.

To provide a high output, line-narrowed molecular fluorine laser system, it is possible to make use of an injection lock type arrangement or an MOPA arrangement, wherein the rise of the sidelight is made so gentle in an oscillation-stage laser including a line-narrowing means that the starting point of a laser pulse can exist after the point of time of the first peak of the sidelight, thereby obtaining a spectral linewidth of 0.2 pm or lower and a pulse energy of 5 mJ or higher.

To provide a high output, line-narrowed KrF or ArF laser system, it is possible to make use of an injection lock type arrangement or an MOPA arrangement, wherein the rise of the sidelight is made so gentle in an oscillation-stage laser including a line-narrowing means that the starting point of a laser pulse can exist after the point of time of the first peak of the sidelight, thereby obtaining a spectral linewidth that is narrower than the linewidth needed for an aligner and a pulse energy of 5 mJ or higher.

What we claim is:

1. A line-narrowed gas laser system comprising a laser chamber filled with an $F_2$-containing laser gas, discharge electrodes located in the laser chamber, a laser resonator and a line-narrowing module located in the laser resonator with a wavelength selection element so that a line-narrowed laser beam emerges from the laser resonator, wherein:
   a duration from a point of time of laser emission by discharge to generation of a laser beam is preset in such a way that ASE is substantially cut off from the laser beam emerging from the laser resonator.

2. A line-narrowed gas laser system comprising a laser chamber filled with an $F_2$-containing laser gas, discharge electrodes located in the laser chamber, a laser resonator and a line-narrowing module located in the laser resonator with a wavelength selection element so that a line-narrowed laser beam emerges from the laser resonator, wherein:
   a duration from a point of time of laser emission by discharge to generation of a laser beam is preset in such a way that at a point of time of generation of the laser beam to emerge from the laser resonator, the laser beam has a given spectral linewidth (FWHM) and/or a given spectral purity.

3. A line-narrowed gas laser system comprising a laser chamber filled with an $F_2$-containing laser gas, discharge electrodes located in the laser chamber, a laser resonator and a line-narrowing module located in the laser resonator with a wavelength selection element so that a line-narrowed laser beam emerges from the laser resonator, wherein:
   a duration from a point of time of laser emission by discharge to generation of a laser beam is preset in such a way that ASE is substantially cut off from the laser beam emerging out of the laser resonator, and at a point of time of generation of the laser beam to emerge out of the laser resonator, the laser beam has a given spectral linewidth (FWHM) and/or a given spectral purity.

4. A line-narrowed gas laser system comprising a laser chamber filled with an $F_2$-containing laser gas, discharge electrodes located in the laser chamber, a laser resonator and a line-narrowing module located in the laser resonator with a wavelength selection element so that a line-narrowed laser beam emerges from the laser resonator, which further comprises:
   a discharge emission detector (or a sidelight detector) for detecting a pulse waveform over time of laser emission by discharge,
   a laser pulse detector for detecting a pulse waveform over time of a laser beam, and
   a controller capable of controlling at least one of a voltage applied to the electrodes, a concentration of $F_2$ in the laser gas and a laser gas pressure in the laser chamber, wherein:
   said controller receives data from said discharge emission detector to determine therefrom a time $T_{SL1}$ of generation of a first peak of a discharge emission waveform with an origin defined by a starting point of the discharge emission waveform and data from said laser pulse detector to determine therefrom a time $T_{LP1}$ of generation of a first peak of a laser pulse waveform with the origin defined by the starting point of the discharge emission waveform, so that at least one of the voltage applied to the electrodes, the concentration of $F_2$ in the laser and the laser gas pressure in the laser chamber is controlled to foreclose a possibility of $T_{SL1}>T_{LP1}$, thereby substantially cutting off ASE from the laser beam emerging out of the laser resonator.

5. A line-narrowed gas laser system comprising a laser chamber filled with an $F_2$-containing laser gas, discharge electrodes located in the laser chamber, a laser resonator and a line-narrowing module located in the laser resonator with a wavelength selection element so that a line-narrowed laser beam emerges from the laser resonator, which further comprises:
   a discharge emission detector (or a sidelight detector) for detecting a pulse waveform over time of laser emission by discharge,
   a laser pulse detector for detecting a pulse waveform over time of a laser beam, and
   a controller capable of controlling at least one of a voltage applied to the electrodes, a concentration of $F_2$ in the laser gas and a laser gas pressure in the laser chamber, wherein:
   said controller receives data from said discharge emission detector to determine therefrom a time $T_{SL1}$ of generation of a first peak of a discharge emission waveform with an origin defined by a starting point of the discharge emission waveform and data from said laser pulse detector to determine therefrom a time $T_{LPS}$ of generation of a laser pulse waveform with the origin defined by the starting point of the discharge emission waveform, so that at least one of the voltage applied to the electrodes, the concentration of $F_2$ in the laser and the laser gas pressure in the laser chamber is controlled to foreclose a possibility of $T_{SL1}>T_{LPS}$, thereby substantially cutting off ASE from the laser beam emerging out of the laser resonator.

6. A line-narrowed gas laser system comprising a laser chamber filled with an $F_2$-containing laser gas, discharge electrodes located in the laser chamber, a laser resonator and a line-narrowing module located in the laser resonator with a wavelength selection element so that a line-narrowed laser beam emerges from the laser resonator, which further comprises:
   a discharge emission detector (or a sidelight detector) for detecting a pulse waveform over time of laser emission by discharge, and
   a controller capable of controlling at least one of a voltage applied to the electrodes, a concentration of $F_2$ in the laser gas and a laser gas pressure in the laser chamber, wherein:
   said controller stores ahead a maximum value $\Delta T_1$ of a maximum gradient of a rising edge of a first peak of a discharge emission waveform in the absence of ASE and receives data from the discharge emission detector to determine therefrom the maximum gradient $\Delta T_s$, of the rising edge of the first peak of the discharge emission waveform, so that at least one of the voltage applied to the electrodes, the concentration of $F_2$ in the laser and the laser gas pressure in the laser chamber is controlled to foreclose a possibility of $\Delta T_s>\Delta T_1$, thereby substantially cutting off ASE from the laser beam emerging out of the laser resonator.

7. A line-narrowed gas laser system comprising a laser chamber filled with an $F_2$-containing laser gas, discharge electrodes located in the laser chamber, a laser resonator and a line-narrowing module located in the laser resonator with a wavelength selection element so that a line-narrowed laser beam emerges from the laser resonator, which further comprises:
- a discharge emission detector (or a sidelight detector) for detecting a pulse waveform over time of laser emission by discharge, and
- a controller capable of controlling at least one of a voltage applied to the electrodes, a concentration of $F_2$ in the laser gas and a laser gas pressure in the laser chamber, wherein:
- said controller stores ahead data on progression over time of a spectral linewidth and/or a spectral purity of light making round trips in the laser resonator and a time $T_{bw}$ obtained from the data, at which values of a given spectral linewidth and/or a given spectral purity are obtained with an origin defined by a starting point of the discharge emission waveform, and receives data from the discharge emission detector to determine therefrom a time $T_{SL1}$ of generation of a first peak of the discharge emission waveform with an origin defined by the starting point of the discharge emission waveform, so that at least one of the voltage applied to the electrodes, the concentration of $F_2$ in the laser and the laser gas pressure in the laser chamber is controlled to foreclose a possibility of $T_{SL1}<T_{bw}$, thereby allowing a laser beam to have the given spectral linewidth (FWHM) and/or the given spectral purity at a point of time of generation of the laser beam to emerge from the laser resonator.

8. A line-narrowed gas laser system comprising a laser chamber filled with an $F_2$-containing laser gas, discharge electrodes located in the laser chamber, a laser resonator and a line-narrowing module located in the laser resonator with a wavelength selection element so that a line-narrowed laser beam emerges from the laser resonator, which further comprises:
- a discharge emission detector (or a sidelight detector) for detecting a pulse waveform over time of laser emission by discharge,
- a laser pulse detector for detecting a pulse waveform over time of a laser beam, and
- a controller capable of controlling at least one of a voltage applied to the electrodes, a concentration of $F_2$ in the laser gas and a laser gas pressure in the laser chamber, wherein:
- said controller stores ahead data on progression over time of a spectral linewidth and/or a spectral purity of light making round trips in the laser resonator and a time $T_{bw}$ obtained from the data, at which values of a given spectral linewidth and/or a given spectral purity are obtained with an origin defined by a starting point of the discharge emission waveform, and receives data from the laser pulse detector to determine therefrom a time $T_{LPS}$ of generation of a laser pulse waveform with an origin defined by the starting point of the discharge emission waveform, so that at least one of the voltage applied to the electrodes, the concentration of $F_2$ in the laser and the laser gas pressure in the laser chamber is controlled to foreclose a possibility of $T_{LPS}<T_{bw}$, thereby allowing a laser beam to have the given spectral linewidth (FWHM) and/or the given spectral purity at a point of time of generation of a laser beam to emerge from the laser resonator.

9. A line-narrowed gas laser system comprising a laser chamber filled with an $F_2$-containing laser gas, discharge electrodes located in the laser chamber, a laser resonator and a line-narrowing module located in the laser resonator with a wavelength selection element so that a line-narrowed laser beam emerges from the laser resonator, which further comprises:
- a discharge emission detector (or a sidelight detector) for detecting a pulse waveform over time of laser emission by discharge,
- a laser pulse detector for detecting a pulse waveform over time of a laser beam, and
- a controller capable of controlling at least one of a voltage applied to the electrodes, a concentration of $F_2$ in the laser gas and a laser gas pressure in the laser chamber, wherein:
- said controller has an ASE control function that a line-narrowed laser system as recited in any one of claims 4, 5 and 6 has and said controller stores ahead data on progression over time of a spectral linewidth and/or a spectral purity of light making round trips in the laser resonator and a time $T_{bw}$ obtained from the data, at which values of a given spectral linewidth and/or a given, spectral purity are obtained with an origin defined by a starting point of the discharge emission waveform, and receives data from the discharge emission detector to determine therefrom a time $T_{SL1}$ of generation of a first peak of the discharge emission waveform with an origin defined by the starting point of the discharge emission waveform, so that at least one of the voltage applied to the electrodes, the concentration of $F_2$ in the laser and the laser gas pressure in the laser chamber is controlled to foreclose a possibility of $T_{SL1}<T_{bw}$, thereby allowing a laser beam to have the given spectral linewidth (FWHM) and/or the given spectral purity at a point of time of generation of the laser beam to emerge from the laser resonator, so that ASE is substantially cut off from the laser beam emerging out of the laser resonator and the laser beam is allowed to have the given spectral linewidth (FWHM) and/or the given spectral purity at a time of generation of the laser beam to emerge out of the laser resonator.

10. A two stage type line-narrowed gas laser system comprising an oscillation-stage laser and an amplification-stage laser, wherein:
- said oscillation-stage laser is a line-narrowed gas laser system as recited in claim 9.

11. A line-narrowed gas laser system as recited in claim 10, wherein:
- said amplification-stage laser comprises a discharge emission detector (a sidelight detector) for detecting a pulse waveform over time of laser emission by discharge and a controller capable of controlling at least one of a voltage applied to discharge electrodes in the amplification-stage laser, a concentration of $F_2$ in a laser gas and a laser gas pressure in a laser chamber, wherein said controller receives from a controller in the oscillation-stage laser timing data $T_{LPS}$ on a rise of a laser pulse in the oscillation-stage laser, so that on the basis of said data, discharge in the amplification-stage laser starts after the rise of the laser pulse in the oscillation-stage laser.

12. A two stage type line-narrowed gas laser system comprising an oscillation-stage laser and an amplification-stage laser, wherein:
- said oscillation-stage laser is a line-narrowed gas laser system as recited in any one of claims 4 to 8.

13. A line-narrowed gas laser system as recited in claim 12, wherein:
- said amplification-stage laser comprises a discharge emission detector (a sidelight detector) for detecting a pulse waveform over time of laser emission by discharge and a controller capable of controlling at least one of a voltage applied to discharge electrodes in the amplification-stage laser, a concentration of $F_2$ in a laser gas and a laser gas pressure in a laser chamber, wherein said controller receives from a controller in the oscillation-stage laser timing data $T_{LPS}$ on a rise of a laser pulse in the oscillation-stage laser, so that on the basis of said data, discharge in the amplification-stage laser starts after the rise of the laser pulse in the oscillation-stage laser.

14. A two stage type line-narrowed gas laser system comprising an oscillation-stage laser and an amplification-stage laser, wherein:
said oscillation-stage laser is a line-narrowed gas laser system as recited in any one of claims 1 to 3.

15. A two stage type line-narrowed gas laser system comprising an oscillation-stage laser and an amplification-stage laser, wherein:
said oscillation-stage laser is a line-narrowed gas laser system comprising:
a laser chamber filled with an $F_2$-containing laser gas, discharge electrodes located in the laser chamber, a laser resonator and a line-narrowing module located in the laser resonator with a wavelength selection element so that a line-narrowed laser beam emerges from the laser resonator, wherein:
a duration from a point of time of laser emission by discharge to generation of a laser beam is preset in such a way that ASE is substantially cut off from the laser beam emerging from the laser resonator, wherein
said amplification-stage laser comprises a discharge emission detector (a sidelight detector) for detecting a pulse waveform over time of laser emission by discharge and a controller capable of controlling at least one of a voltage applied to discharge electrodes in the amplification-stage laser, a concentration of $F_2$ in a laser gas and a laser gas pressure in a laser chamber, wherein said controller receives from a controller in the oscillation-stage laser timing data $T_{LPS}$ on a rise of a laser pulse in the oscillation-stage laser, so that on the basis of said data, discharge in the amplification-stage laser starts after the rise of the laser pulse in the oscillation-stage laser.

16. A line-narrowed gas laser system comprising a laser chamber filled with an $F_2$-containing laser gas, discharge electrodes located in the laser chamber, a laser resonator and a line-narrowing module located in the laser resonator with a wavelength selection element so that a line-narrowed laser beam emerges from the laser resonator, which further comprises:
a discharge emission detector (or a sidelight detector) for detecting a pulse waveform over time of laser emission by discharge,
a laser pulse detector for detecting a pulse waveform over time of a laser beam, and
a controller capable of controlling at least one of a voltage applied to the electrodes, a concentration of $F_2$ in the laser gas and a laser gas pressure in the laser chamber, wherein:
said controller has an ASE control function that a line-narrowed laser system as recited in any one of claims 4, 5 and 6 has and
said controller stores ahead data on progression over time of a spectral linewidth and/or a spectral purity of light making round trips in the laser resonator and a time $T_{bw}$ obtained from the data, at which values of a given spectral linewidth and/or a given spectral purity are obtained with an origin defined by a starting point of the discharge emission waveform, and receives data from the laser pulse detector to determine therefrom a time $T_{LPS}$ of generation of a laser pulse waveform with an origin defined by the starting point of the discharge emission waveform, so that at least one of the voltage applied to the electrodes, the concentration of $F_2$ in the laser and the laser gas pressure in the laser chamber is controlled to foreclose a possibility of $T_{LPS} < T_{bw}$, thereby allowing a laser beam to have the given spectral linewidth (FWHM) and/or the given spectral purity at a point of time of generation of a laser beam to emerge from the laser resonator, so that ASE is substantially cut off from the laser beam emerging out of the laser resonator and the laser beam is allowed to have the given spectral linewidth (FWHM) and/or the given spectral purity at a time of generation of the laser beam to emerge out of the laser resonator.

17. A two stage type line-narrowed gas laser system comprising an oscillation-stage laser and an amplification-stage laser, wherein:
said oscillation-stage laser is a line-narrowed gas laser system as recited in claim 16.

18. A line-narrowed gas laser system as recited in claim 17, wherein:
said amplification-stage laser comprises a discharge emission detector (a sidelight detector) for detecting a pulse waveform over time of laser emission by discharge and a controller capable of controlling at least one of a voltage applied to discharge electrodes in the amplification-stage laser, a concentration of $F_2$ in a laser gas and a laser gas pressure in a laser chamber, wherein said controller receives from a controller in the oscillation-stage laser timing data $T_{LPS}$ on a rise of a laser pulse in the oscillation-stage laser, so that on the basis of said data, discharge in the amplification-stage laser starts after the rise of the laser pulse in the oscillation-stage laser.

19. A two stage type line-narrowed gas laser system comprising an oscillation-stage laser and an amplification-stage laser, wherein:
said oscillation-stage laser is a line-narrowed gas laser system comprising:
a laser chamber filled with an $F_2$-containing laser gas, discharge electrodes located in the laser chamber, a laser resonator and a line-narrowing module located in the laser resonator with a wavelength selection element so that a line-narrowed laser beam emerges from the laser resonator, wherein:
a duration from a point of time of laser emission by discharge to generation of a laser beam is preset in such a way that at a point of time of generation of the laser beam to emerge from the laser resonator, the laser beam has a given spectral linewidth (FWHN) and/or a given spectral purity; wherein
said amplification-stage laser comprises a discharge emission detector (a sidelight detector) for detecting a pulse waveform over time of laser emission by discharge and a controller capable of controlling at least one of a voltage applied to discharge electrodes in the amplification-stage laser, a concentration of $F_2$ in a laser gas and a laser gas pressure in a laser chamber, wherein said controller receives from a controller in the oscillation-stage laser timing data $T_{LPS}$ on a rise of a laser pulse in the oscillation-stage laser, so that on the basis of said data, discharge in the amplification-stage laser starts after the rise of the laser pulse in the oscillation-stage laser.

20. A two stage type line-narrowed gas laser system comprising an oscillation-stage laser and an amplification-stage laser, wherein:

said oscillation-stage laser is a line-narrowed gas laser system comprising:

a laser chamber filled with an $F_2$-containing laser gas, discharge electrodes located in the laser chamber, a laser resonator and a line-narrowing module located in the laser resonator with a narrowed laser beam emerges from the laser resonator, wherein:

a duration from a point of time of laser emission by discharge to generation of a laser beam is preset in such a way that ASE is substantially cut of f from the laser beam emerging out of the laser resonator, and at a point of time of generation of the laser beam to emerge out of the laser resonator, the laser beam has a given spectral linewidth (FWHM) and/or a given spectral purity; and wherein said amplification-stage laser comprises a discharge emission detector (a sidelight detector) for detecting a pulse waveform over time of laser emission by discharge and a controller capable of controlling at least one of a voltage applied to discharge electrodes in the amplification-stage laser, a concentration of $F_2$ in a laser gas and a laser gas pressure in a laser chamber, wherein said controller receives from a controller in the oscillation-stage laser timing data $T_{LPS}$ on a rise of a laser pulse in the oscillation-stage laser, so that on the basis of said data, discharge in the amplification-stage laser starts after the rise of the laser pulse in the oscillation-stage laser.

* * * * *